US012748720B2

(12) United States Patent
Hamlin et al.

(10) Patent No.: US 12,748,720 B2
(45) Date of Patent: Sep. 29, 2026

(54) SYSTEMS AND METHODS FOR SELECTING AN OPTIMAL COMMUNICATION PATH IN A HETEROGENEOUS COMPUTING PLATFORM

(71) Applicant: Dell Products L.P., Round Rock, TX (US)

(72) Inventors: Daniel L. Hamlin, Round Rock, TX (US); Gokul Thiruchengode Vajravel, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/611,765

(22) Filed: Mar. 21, 2024

(65) Prior Publication Data

US 2025/0298767 A1 Sep. 25, 2025

(51) Int. Cl.
*G06F 13/42* (2006.01)
*G06F 13/38* (2006.01)

(52) U.S. Cl.
CPC ........ *G06F 13/4282* (2013.01); *G06F 13/382* (2013.01); *G06F 2213/0016* (2013.01); *G06F 2213/0042* (2013.01)

(58) Field of Classification Search
CPC ............... G06F 13/4282; G06F 13/382; G06F 2213/0016; G06F 2213/0042
USPC ............................ 710/8, 18, 33, 38, 62, 105
See application file for complete search history.

(56) References Cited

U.S. PATENT DOCUMENTS

2005/0165881 A1* 7/2005 Brooks ................. G06F 9/5027 709/200
2008/0123532 A1* 5/2008 Ward .................... H04L 45/125 370/238
2010/0046435 A1* 2/2010 Jeon ........................ H04L 45/42 370/328
2014/0181573 A1* 6/2014 Goss ....................... H04L 49/10 710/305
2016/0277282 A1* 9/2016 Chen ..................... H04L 45/122
2021/0351989 A1* 11/2021 Toy ......................... H04L 47/83
2022/0131781 A1* 4/2022 Hua ........................ H04L 45/17
2022/0295242 A1* 9/2022 Taft, III ................ H04W 40/22
2022/0345535 A1* 10/2022 Enrici ................. G06F 16/9027
2024/0013025 A1* 1/2024 Luo ........................ G06N 3/063

* cited by examiner

*Primary Examiner* — Idriss N Alrobaye
*Assistant Examiner* — Henry W Yu
(74) *Attorney, Agent, or Firm* — Fogarty LLP

(57) ABSTRACT

Systems and methods for optimal path selection are described. In an illustrative, non-limiting embodiment, an Information Handling System (IHS) may include a controller that instantiates an orchestrator, and multiple devices coupled to the controller in which each device instantiates a node. The IHS also includes computer-executable instructions that, upon execution by the processor, cause a processor to identify a plurality of communication links between the nodes, wherein the communication links cause at least one of the nodes to have multiple paths to the orchestrator, determine a best path to the controller for the at least one node, and communicate with the at least one node using the best path.

20 Claims, 15 Drawing Sheets

1000

| PATHS (CONNECTING NODES) 1004A | CONNECTION PROTOCOL 1004B | PROPERTIES 1004C | VALUE (V) 1004D | WEIGHT (W) [BY POWER CONSUMPTION] 1004E | |
|---|---|---|---|---|---|
| (1,5) | USB 3.0 | • HIGH BW & SPEED<br>• LOW LATENCY<br>• HIGH PERF/W<br>• RELIABLE & STREAMING MESSAGES | 8 | 8 | 1002A |
| (2,5) | USB 2.0 | • MED BW & SPEED<br>• LOW LATENCY<br>• MED PERF/W<br>• RELIABLE & STREAMING MESSAGES | 7 | 5 | 1002B |
| (1,2) | SPI | • LOW BW & SPEED<br>• LOW LATENCY<br>• HIGH PERF/W<br>• RELIABLE MESSAGES | 5 | 3 | 1002C |
| (3,5) | I2C | • LOW BW & SPEED<br>• MED LATENCY<br>• MED PERF/W<br>• RELIABLE MESSAGES | 4 | 2 | 1002D |
| (2,3) | SPI | • LOW BW & SPEED<br>• LOW LATENCY<br>• HIGH PERF/W<br>• RELIABLE MESSAGES | 5 | 3 | 1002F |
| (4,5) | I2C | • LOW BW & SPEED<br>• MED LATENCY<br>• MED PERF/W<br>• RELIABLE MESSAGES | 4 | 2 | 1002G |

FIG. 10

1400

| | PATH SELECTION ALGORITHMS | BEST SUITED FOR | OTHER REQUIREMENTS FOR THIS ALGO | PATH SELECTION ALGO - DESCRIPTION |
|---|---|---|---|---|
| 1402A | SHORTEST QUEUE BYTES | HETEROGENOUS PATHS | NODE NEEDS TO MAINTAIN & SHARE THE IO QUEUE STATS (IN BYTES) | THE NEXT PATH FOR THE IO IS THE ONE THAT HAS LESSER NO.OF BYTES (ACROSS ALL PENDING IO REQUEST) IN THE NODE'S QUEUE |
| 1402B | SHORTEST QUEUE SERVICE TIME | HETEROGENOUS PATHS | NODE NEEDS TO MAINTAIN & SHARE THE IO QUEUE STATS (IN LAST OR AVG SERVICE TIME) | THE NEXT PATH FOR THE IO IS THE ONE THAT SERVICES THE REQUEST SOONER (BASED ON LAST REQ OR LAST N-AVERAGE) |
| 1402C | ROUND ROBIN | HOMOGENOUS PATHS | NONE | CLASSIC ROUND ROBIN |
| 1402D | WEIGHTED ROUND ROBIN | HETEROGENOUS PATHS | NONE | WEIGHTED ROUND ROBIN |
| 1402E | • • • | • • • | • • • | • • • |

FIG. 14

SYSTEMS AND METHODS FOR SELECTING AN OPTIMAL COMMUNICATION PATH IN A HETEROGENEOUS COMPUTING PLATFORM

FIELD

This disclosure relates generally to Information Handling Systems (IHSs), and more specifically, to systems and methods for selecting an optimal communication path in a heterogeneous computing platform.

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use, such as financial transaction processing, airline reservations, enterprise data storage, or global communications. In addition, IHSs may include a variety of hardware and software components that may be configured to process, store, and communicate information and may include one or more computer systems, data storage systems, and networking systems.

Historically, IHSs with desktop and laptop form factors have had conventional host Operating Systems (OSs) (e.g., WINDOWS, LINUX, MAC OS, etc.) executed on INTEL or AMD's "x86"-type processors. Other types of processors, such as ARM processors, have been used in smartphones and tablet devices, which typically run thinner, simpler, or mobile OSs (e.g., ANDROID, iOS, WINDOWS MOBILE, etc.).

As of more recently, however, IHS manufacturers have begun shipping full-fledged desktop and laptop IHSs equipped with ARM-based platforms, and some OSs (e.g., WINDOWS on ARM) have been developed to provide users with more quintessential OS experiences on those platforms.

Therefore, a modern IHS may now include any number of processors, controllers, sensors, and/or other devices. Within an IHS, each device may be configured to execute their own firmware. The term "firmware," as used herein, refers to a class of program instructions that provides low-level control of a device's hardware.

In that regard, the inventors hereof have recognized that management of a device's firmware within an IHS is typically performed indirectly through the IHS's OS, which presents efficiency, productivity, and/or security issues. To address these, and other concerns, the inventors hereof have developed a firmware framework as described herein.

SUMMARY

Systems and methods for optimal path selection are described. In an illustrative, non-limiting embodiment, an Information Handling System (IHS) may include a controller that instantiates an orchestrator, and multiple devices coupled to the controller in which each device instantiates a node. The IHS also includes computer-executable instructions that, upon execution by the processor, cause a processor to identify a plurality of communication links between the nodes, wherein the communication links cause at least one of the nodes to have multiple paths to the orchestrator, determine a best path to the controller for the at least one node, and communicate with the at least one node using the best path.

According to another embodiment, an optimal communication path selection method includes the steps of identifying, using a controller of a heterogeneous computing platform, a plurality of communication links between a plurality of nodes configured in the heterogeneous computing platform, wherein the communication links cause at least one of the nodes to have multiple paths to the orchestrator, determining a best path to the controller for the at least one node, and communicating with the at least one node using the best path.

According to yet another embodiment, an Embedded Controller (EC) is provided that includes a processing core distinct from any host processor of an heterogeneous computing platform, and a memory coupled to the processing core. The memory has firmware stored thereon that, upon execution by the processing core, cause the EC to identify a plurality of communication links between a plurality of nodes of the heterogeneous computing platform, wherein the communication links cause at least one of the nodes to have multiple paths to the EC, determine a best path to the controller for the at least one node, and communicate with the at least one node using the best path.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

FIG. 10 illustrates an example table that may be used by the OS agent to store weight and values associated with a communication link according to some embodiments.

FIG. 14 illustrates an example table that may be used to select a path based upon certain criteria according to some embodiments.

DETAILED DESCRIPTION

Figure 1:
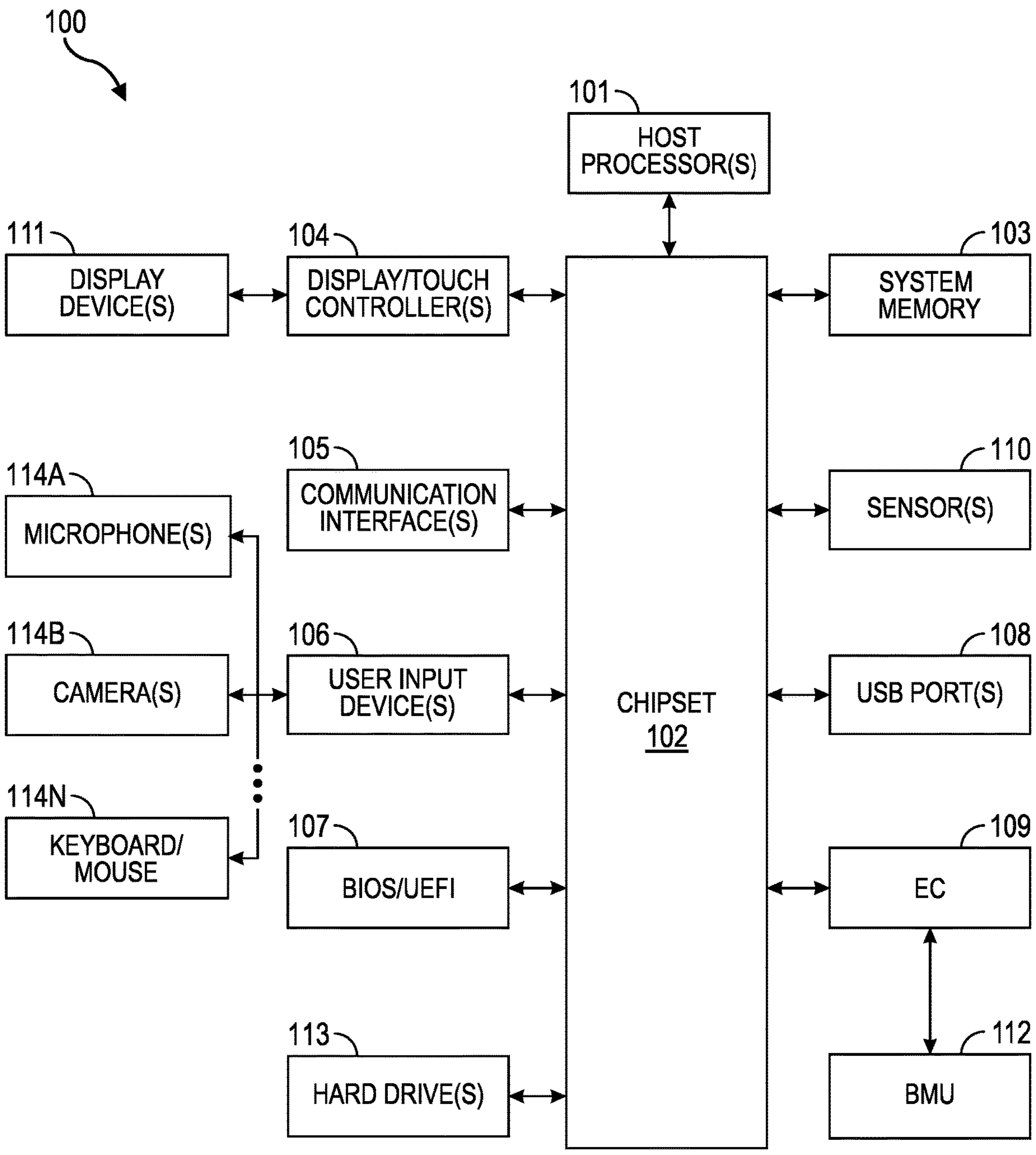
FIG. 1 is a diagram illustrating examples of components of an Information Handling System (IHS), according to some embodiments.

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

The terms "heterogenous computing platform," "heterogenous processor," or "heterogenous platform," as used herein, refer to an Integrated Circuit (IC) or chip (e.g., a System-On-Chip or "SoC," a Field-Programmable Gate Array or "FPGA," an Application-Specific Integrated Circuit or "ASIC," etc.) containing a plurality of discrete processing circuits or semiconductor Intellectual Property (IP) cores (collectively referred to as "SoC devices" or simply "devices") in a single electronic or semiconductor package, where each device has different processing capabilities suitable for handling a specific type of computational task. Examples of heterogenous processors include, but are not limited to: QUALCOMM's SNAPDRAGON, SAMSUNG's EXYNOS, APPLE's "A" SERIES, etc.

The term "firmware," as used herein, refers to a class of program instructions that provides low-level control for a device's hardware. Firmware enables basic functions of a device and/or provides hardware abstraction services to higher-level software, such as an Operating System (OS). The term "firmware installation package," as used herein, refers to program instructions that, upon execution, deploy device drivers or services in an IHS or IHS component.

The term "device driver" or "driver," as used herein, refers to program instructions that operate or control a particular type of device. A driver provides a software interface to hardware devices, enabling an OS and other applications to access hardware functions without needing to know precise details about the hardware being used. When an application invokes a routine in a driver, the driver issues commands to a corresponding device. Once the device sends data back to the driver, the driver may invoke certain routines in the application. Generally, device drivers are hardware dependent and OS-specific.

The term "telemetry," as used herein, refers to information resulting from in situ collection of measurements or other data by devices within a heterogenous computing platform, or any other IHS device or component, and its transmission (e.g., automatically) to a receiving entity, for example, for monitoring purposes. Typically, telemetry may include, but is not limited to, measurements, metrics, and/or values which may be indicative of: core utilization, memory utilization, CPU performance state, network quality/utilization/bandwidth/throughput, battery charging or state data, peripheral or I/O device utilization, temperature, location, acceleration, power state, etc.

For instance, telemetry data may include, but is not limited to, measurements, metrics, logs, or other information related to: current or average utilization of IHS components or devices, CPU/core loads, instant or average power consumption, instant or average memory usage, characteristics of a network or radio system (e.g., WiFi vs. 5G, bandwidth, latency, etc.), transaction times, latencies, response codes, errors, data produced by other sensors, etc.

FIG. 1 is a block diagram of components of IHS 100. As depicted, IHS 100 includes host processor(s) 101. In various embodiments, IHS 100 may be a single-processor system, or a multi-processor system including two or more processors. Host processor(s) 101 may include any processor capable of executing program instructions, such as an INTEL/AMD x86 processor, or any general-purpose or embedded processor implementing any of a variety of Instruction Set Architectures (ISAs), such as a Complex Instruction Set Computer (CISC) ISA, a Reduced Instruction Set Computer (RISC) ISA (e.g., one or more ARM core(s), or the like).

IHS 100 includes chipset 102 coupled to host processor(s) 101. Chipset 102 may provide host processor(s) 101 with access to several resources. In some cases, chipset 102 may utilize a QuickPath Interconnect (QPI) bus to communicate with host processor(s) 101. Chipset 102 may also be coupled to communication interface(s) 105 to enable communications between IHS 100 and various wired and/or wireless networks, such as Ethernet, WiFi, BT, cellular or mobile networks (e.g., Code-Division Multiple Access or "CDMA," Time-Division Multiple Access or "TDMA," Long-Term Evolution or "LTE," etc.), satellite networks, or the like.

Communication interface(s) 105 may be used to communicate with peripheral devices (e.g., BT speakers, microphones, headsets, etc.). Moreover, communication interface(s) 105 may be coupled to chipset 102 via a Peripheral Component Interconnect Express (PCIe) bus, or the like.

Chipset 102 may be coupled to display and/or touchscreen controller(s) 104, which may include one or more Graphics Processor Units (GPUs) on a graphics bus, such as an Accelerated Graphics Port (AGP) or PCIe bus. As shown, display controller(s) 104 provide video or display signals to one or more display device(s) 111.

Display device(s) 111 may include Liquid Crystal Display (LCD), Light Emitting Diode (LED), organic LED (OLED), or other thin film display technologies. Display device(s) 111 may include a plurality of pixels arranged in a matrix, configured to display visual information, such as text, two-dimensional images, video, three-dimensional images, etc. In some cases, display device(s) 111 may be provided as a single continuous display, rather than two discrete displays.

Chipset 102 may provide host processor(s) 101 and/or display controller(s) 104 with access to system memory 103. In various embodiments, system memory 103 may be implemented using any suitable memory technology, such as static RAM (SRAM), dynamic RAM (DRAM) or magnetic disks, or any nonvolatile/Flash-type memory, such as a Solid-State Drive (SSD), Non-Volatile Memory Express (NVMe), or the like.

In certain embodiments, chipset 102 may also provide host processor(s) 101 with access to one or more Universal Serial Bus (USB) ports/controllers 108, to which one or more peripheral devices may be coupled (e.g., integrated or external webcams, microphones, speakers, etc.).

Chipset 102 may further provide host processor(s) 101 with access to one or more hard disk drives, solid-state drives, optical drives, or other removable-media drives 113.

Chipset 102 may also provide access to one or more user input devices 106, for example, using a super I/O controller or the like. Examples of user input devices 106 include, but are not limited to, microphone(s) 114A, camera(s) 114B, and keyboard/mouse 114N. Other user input devices 106 may include a touchpad, stylus or active pen, totem, etc. Each user input device 106 may include a respective controller (e.g., a touchpad may have its own touchpad controller) that interfaces with chipset 102 through a wired or wireless connection (e.g., via communication interfaces(s) 105).

In some cases, chipset 102 may also provide access to one or more user output devices (e.g., video projectors, paper printers, 3D printers, loudspeakers, audio headsets, Virtual/Augmented Reality (VR/AR) devices, etc.).

In certain embodiments, chipset 102 may further provide an interface for communications with one or more hardware sensors 110. Sensors 110 may be disposed on or within the chassis of IHS 100, or otherwise coupled to IHS 100, and may include, but are not limited to: electric, magnetic, radio, optical (e.g., camera, webcam, etc.), infrared, thermal, force, pressure, acoustic (e.g., microphone), ultrasonic, proximity, position, deformation, bending, direction, movement, velocity, rotation, gyroscope, Inertial Measurement Unit (IMU), and/or acceleration sensor(s).

BIOS/UEFI 107 is coupled to chipset 102. UEFI was designed as a successor to BIOS, and many modern IHSs utilize UEFI in addition to or instead of a BIOS. Accordingly, BIOS/UEFI 107 is intended to also encompass a UEFI component. BIOS/UEFI 107 provides an abstraction layer that allows the OS to interface with certain hardware components that are utilized by IHS 100.

Upon booting of IHS 100, host processor(s) 101 may utilize program instructions of BIOS 107 to initialize and test hardware components coupled to IHS 100, and to load a host OS for use by IHS 100. Via the hardware abstraction layer provided by BIOS/UEFI 107, software stored in system memory 103 and executed by host processor(s) 101 can interface with I/O devices coupled to IHS 100.

Embedded Controller (EC) 109 (sometimes referred to as a Baseboard Management Controller or "BMC") includes a microcontroller unit or processing core dedicated to handling selected IHS operations not ordinarily handled by host processor(s) 101.

Examples of such operations may include, but are not limited to: power sequencing, power management, receiving and processing signals from a keyboard or touchpad, as well as other buttons and switches (e.g., power button, laptop lid switch, etc.), receiving and processing thermal measurements (e.g., performing cooling fan control, throttling CPUs and GPUs, controlling cooling fan speeds, and emergency shutdown), controlling indicator Light-Emitting Diodes or "LEDs" (e.g., caps lock, scroll lock, num lock, battery, ac, power, wireless LAN, sleep, etc.), managing the battery charger and the battery, enabling remote or Out-of-Band (OOB) management, diagnostics, and remediation over network(s), and the like.

Unlike other devices in IHS 100, EC 109 may be made operational from the very start of each power reset, before other devices are fully running or powered on. As such, EC 109 may be responsible for interfacing with a power adapter to manage the power consumption of IHS 100. These operations may be utilized to determine the power status of IHS 100, such as whether IHS 100 is operating from battery power or is plugged into an AC power source. Firmware instructions utilized by EC 109 may be used to manage other core operations of IHS 100 (e.g., turbo modes, maximum operating clock frequencies of certain components, etc.).

In some cases, EC 109 may implement operations for detecting certain changes to the physical configuration or posture of IHS 100 and managing other devices in different configurations of IHS 100. For instance, when IHS 100 as a 2-in-1 laptop/tablet form factor, EC 109 may receive inputs from a lid position or hinge angle sensor 110, and it may use those inputs to determine: whether the two sides of IHS 100 have been latched together to a closed position or a tablet position, the magnitude of a hinge or lid angle, etc. In response to these changes, the EC may enable or disable certain features of IHS 100 (e.g., front or rear facing camera, etc.).

In some implementations, EC 109 may be installed as a Trusted Execution Environment (TEE) component to the motherboard of IHS 100. Additionally, or alternatively, EC 109 may be further configured to calculate hashes or signatures that uniquely identify individual components of IHS 100. In such scenarios, EC 109 may calculate a hash value based on the configuration of a hardware and/or software component coupled to IHS 100. For instance, EC 109 may calculate a hash value based on all firmware and other code or settings stored in an onboard memory of a hardware component.

Hash values may be calculated as part of a trusted process of manufacturing IHS 100 and may be maintained in secure storage as a reference signature. EC 109 may later recalculate the hash value for a component, compare it against the reference hash value to determine if any modifications have been made to the component, thus indicating that the component has been compromised. As such, EC 109 may validate the integrity of hardware and software components installed in IHS 100.

In addition, EC 109 may provide an Out-of-Band communication channel that allows an Information Technology Decision Maker (ITDM) or Original Equipment Manufacturer (OEM) to manage IHS 100's various settings and configurations, for example, by issuing OOB commands.

In various embodiments, IHS 100 may be coupled to an external power source through an AC adapter, power brick, or the like. The AC adapter may be removably coupled to a battery charge controller to provide IHS 100 with a source of DC power provided by battery cells of a battery system in the form of a battery pack (e.g., a lithium ion or "Li-ion"

battery pack, or a nickel metal hydride or "NiMH" battery pack including one or more rechargeable batteries).

Figure 2:
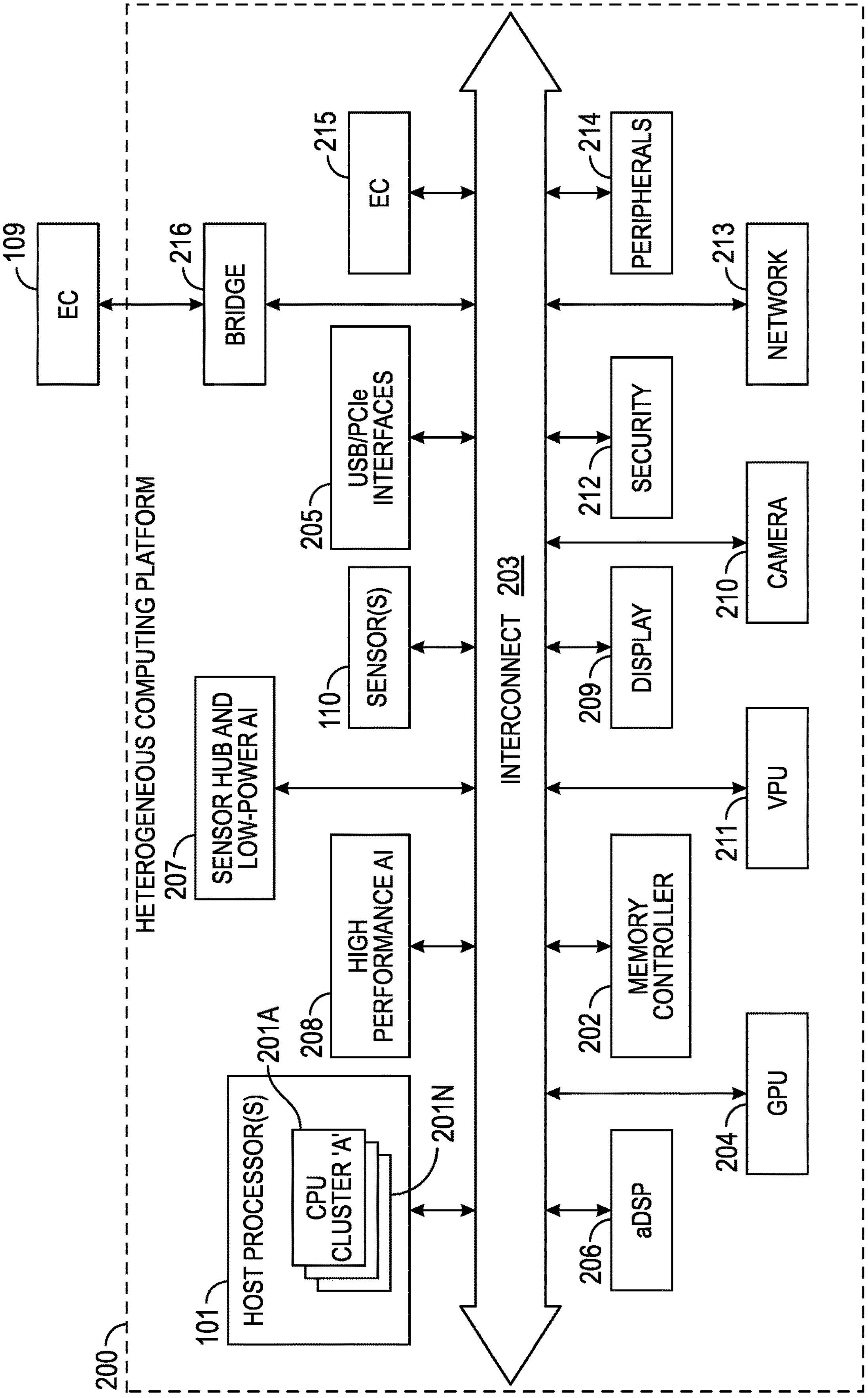
FIG. 2 is a diagram illustrating an example of a heterogenous computing platform, according to some embodiments.

Battery Management Unit (BMU) 112 may be coupled to EC 109 and it may include, for example, an Analog Front End (AFE), storage (e.g., non-volatile memory), and a microcontroller. In some cases, BMU 112 may be configured to collect and store information, and to provide that information to other IHS components, such as, for example, devices within heterogeneous computing platform 200 (FIG. 2).

Examples of information collectible by BMU 112 may include, but are not limited to: operating conditions (e.g., battery operating conditions including battery state information such as battery current amplitude and/or current direction, battery voltage, battery charge cycles, battery state of charge, battery state of health, battery temperature, battery usage data such as charging and discharging data; and/or IHS operating conditions such as processor operating speed data, system power management and cooling system settings, state of "system present" pin signal), environmental or contextual information or state (e.g., such as ambient temperature, relative humidity, system geolocation measured by GPS or triangulation, time and date, etc.), events, etc.

Examples of events may include, but are not limited to: acceleration or shock events, system transportation events, exposure to elevated temperature for extended time periods, high discharge current rate, combinations of battery voltage, battery current and/or battery temperature (e.g., elevated temperature event at full charge and/or high voltage causes more battery degradation than lower voltage), etc.

In some embodiments, IHS 100 may not include all the components shown in FIG. 1. In other embodiments, IHS 100 may include other components in addition to those that are shown in FIG. 1. Furthermore, some components that are represented as separate components in FIG. 1 may instead be integrated with other components, such that all or a portion of the operations executed by the illustrated components may instead be executed by the integrated component.

For example, in various embodiments described herein, host processor(s) 101 and/or other components shown in FIG. 1 (e.g., chipset 102, display controller(s) 104, communication interface(s) 105, EC 109, etc.) may be replaced by devices within heterogenous computing platform 200 (FIG. 2). As such, IHS 100 may assume different form factors including, but not limited to: servers, workstations, desktops, laptops, appliances, video game consoles, tablets, smartphones, etc.

FIG. 2 is a diagram illustrating an example of heterogenous computing platform 200. In various embodiments, heterogenous computing platform 200 may be implemented in an SoC, FPGA, ASIC, or the like. Heterogenous computing platform 200 includes a plurality of discrete or segregated devices or components, each device having a different set of processing capabilities suitable for handling a particular type of computational task. When each device in platform 200 executes only the types of computational tasks it is specifically designed to execute, the overall power consumption of heterogenous computing platform 200 is reduced.

In various implementations, each device in heterogenous computing platform 200 may include its own microcontroller(s) or core(s) (e.g., ARM core(s)) and corresponding firmware. In some cases, a device in platform 200 may also include its own hardware-embedded accelerator (e.g., a secondary or co-processing core coupled to a main core). Each device in heterogenous computing platform 200 may execute its own firmware, and it may be accessible through a respective Application Programming Interface (API). Additionally, or alternatively, each device in heterogenous computing platform 200 may execute its own OS. Additionally, or alternatively, one or more of these devices may be a virtual device.

In the example of FIG. 2, heterogenous computing platform 200 includes CPU clusters 201A-N as a particular implementation of host processor(s) 101 intended to perform general-purpose computing operations. Each of CPU clusters 201A-N may include one or more processing core(s) and cache memor(ies). In operation, CPU clusters 201A-N are available and accessible to the IHS's host OS 300 (e.g., WINDOWS on ARM), optimization application(s), OS agent(s), and other application(s) executed by IHS 100.

CPU clusters 201A-N are coupled to memory controller 202 via internal interconnect fabric 203. Memory controller 202 is responsible for managing memory accesses for all of devices connected to internal interconnect fabric 203, which may include any communication bus suitable for inter-device communications within an SoC (e.g., Advanced Microcontroller Bus Architecture or "AMBA," QuickPath Interconnect or "QPI," HyperTransport or "HT," etc.). All devices coupled to internal interconnect fabric 203 can communicate with each other and with a host OS executed by CPU clusters 201A-N.

GPU 204 is a device designed to produce graphical or visual content and to communicate that content to a monitor or display, where the content may be rendered. USB/PCIe interfaces 205 provide an entry point into any additional devices external to heterogenous computing platform 200 that have a respective USB/PCIe interface (e.g., docking station, graphics adapter, Type-C USB controllers, etc.).

Audio Digital Signal Processor (aDSP) 206 is a device designed to perform audio and speech operations and to perform in-line enhancements for audio input(s) and output(s). Examples of audio and speech operations include, but are not limited to: noise reduction, echo cancellation, directional audio detection, wake word detection, muting and volume controls, filters and effects, etc.

In operation, input and/or output audio streams may pass through and be processed by aDSP 206, which can send the processed audio to other devices on internal interconnect fabric 203 (e.g., CPU clusters 201A-N). Also, aDSP 206 may be configured to process one or more of heterogenous computing platform 200's sensor signals (e.g., gyroscope, accelerometer, pressure, temperature, etc.), low-power vision or camera streams (e.g., for user presence detection, onlooker detection, etc.), or battery data (e.g., to calculate a charge or discharge rate, current charge level, etc.). To that end, aDSP 206 may be coupled to BMU 112.

Sensor hub and low-power AI device 207 is a very low power, always-on device designed to consolidate information received from other devices in heterogenous computing platform 200, process any context and/or telemetry data streams, and provide that information to: (i) a host OS, (ii) other applications, and/or (iii) other devices in platform 200. For example, sensor hub and low-power AI device 207 may include General-Purpose Input/Output (GPIOs) that provide Inter-Integrated Circuit ($I^2C$), Improved $I^2C$ ($I^3C$), Serial Peripheral Interface (SPI), Enhanced SPI (eSPI), and/or serial interfaces to receive data from sensors (e.g., sensors 110, camera 210, peripherals 214, etc.).

Sensor hub and low-power AI device 207 may include an always-on, low-power core configured to execute small neural networks and specific applications, such as contextual awareness and other enhancements. In some embodiments, sensor hub and low-power AI device 207 may be configured to operate as an orchestrator device in charge of managing other devices, for example, based upon a policy or the like.

High-performance AI device 208 is a significantly more powerful processing device than sensor hub and low-power AI device 207, and it may be designed to execute multiple complex AI algorithms and models concurrently (e.g., Natural Language Processing, speech recognition, speech-to-text transcription, video processing, gesture recognition, user engagement determinations, etc.). For example, high-performance AI device 208 may include a Neural Processing Unit (NPU), Tensor Processing Unit (TPU), Neural Network Processor (NNP), or Intelligence Processing Unit (IPU), and it may be designed specifically for AI and Machine Learning (ML), which speeds up the processing of AI/ML tasks while also freeing processor(s) 101 to perform other tasks.

Display/graphics device 209 is designed to perform additional video enhancement operations. In operation, display/graphics device 209 may provide a video signal to an external display coupled to IHS 100 (e.g., display device(s) 111).

Camera device 210 includes an Image Signal Processor (ISP) configured to receive and process video frames captured by a camera coupled to heterogenous computing platform 200 (e.g., in the visible and/or infrared spectrum).

Video Processing Unit (VPU) 211 is a device designed to perform hardware video encoding and decoding operations, thus accelerating the operation of camera 210 and display/graphics device 209. VPU 211 may be configured to provide optimized communications with camera device 210 for performance improvements.

In some cases, devices 209-211 may be coupled to internal interconnect fabric 203 via a secondary interconnect fabric (not shown). A secondary interconnect fabric may include any bus suitable for inter-device and/or inter-bus communications within a SoC.

Security device 212 includes any suitable security device, such as a dedicated security processor, a Trusted Platform Module (TPM), a TRUSTZONE device, a PLUTON processor, or the like. In various implementations, security device 212 may be used to perform cryptography operations (e.g., generation of cryptographic key pairs, validation of digital certificates, etc.) and/or it may serve as a hardware root-of-trust (RoT) for heterogenous computing platform 200 and/or IHS 100.

Network controller 213 is a device designed to enable wired (e.g., Ethernet) and/or wireless communications in any suitable frequency band (e.g., BLUETOOTH or "BT," WiFi, CDMA, 5G, satellite, etc.), subject to AI-powered optimizations/customizations for improved speeds, reliability, and/or coverage.

Peripherals 214 may include any device coupled to heterogenous computing platform 200 (e.g., sensors 110) through mechanisms other than USB/PCIe interfaces 205. In some cases, peripherals 214 may include interfaces to integrated devices (e.g., built-in microphones, speakers, and/or cameras), wired devices (e.g., external microphones, speakers, and/or cameras, Head-Mounted Devices/Displays or "HMDs," printers, displays, etc.), and/or wireless devices (e.g., wireless audio headsets, etc.) coupled to IHS 100.

In some cases, devices 212 and 213 may be coupled to internal interconnect fabric 203 via the same secondary interconnect serving devices 209-211 (not shown). Additionally, or alternatively, devices 212 and/or 213 may be coupled to internal interconnect fabric 203 via another secondary interconnect.

In various embodiments, one or more devices of heterogeneous computing platform 200 (e.g., GPU 204, aDSP 206, sensor hub and low-power AI device 207, high-performance AI device 208, VPU 211, etc.) may be configured to execute one or more AI model(s), simulation(s), and/or inference(s).

In some implementations, EC 215 may be integrated into heterogenous computing platform 200 of IHS 100. In other implementations EC 109 may be completely external to platform 200 (i.e., it may reside in its own semiconductor package) but coupled to integrated bridge 216 via an interface (e.g., enhanced SPI or "eSPI") to provide or maintain the EC's ability to access the SoC's internal interconnect fabric 203, including sensor hub 207 and sensor(s) 110, and to allow EC 109C to access and/or run most or all of devices 201-216 and 110 directly. In each of these scenarios, EC 109 may be configured to operate as an orchestrator instead of (or along with) sensor hub and low-power AI device 207.

In some embodiments, heterogeneous computing platform 200 may not include all the devices shown in FIG. 2. In other embodiments, IHS 100 may include other devices in addition to those that are shown in FIG. 2. Furthermore, some devices that are represented as separate components in FIG. 2 may instead be integrated with other devices, such that all or a portion of the operations executed by the illustrated devices may instead be executed by the integrated device.

As the inventors hereof have recognized, recent industry trends by major computer manufacturers indicate a push towards manufacturer-specific hardware (e.g., ICs, chips, etc.) and software (e.g., OS, etc.) level implementations that are likely to present barriers for Original Equipment Manufacturers (OEM) to continue to offer differentiated IHSs to their customers.

To address these, and other concerns, a firmware framework is presented below. This firmware framework may enable a selected device to serve as its intelligence center. In various embodiments, EC 109/215 may operate an orchestrator to enable firmware-level, system-wide management of devices and operations. As such, the firmware framework may take all (or part) of bare metal IHS 100 and transform it into a logic platform capable of addressing existing and future challenges with a foundation for extensibility (e.g., with reusable modules, standardized communication paths, etc.), independent of device manufacturers.

Figure 3:
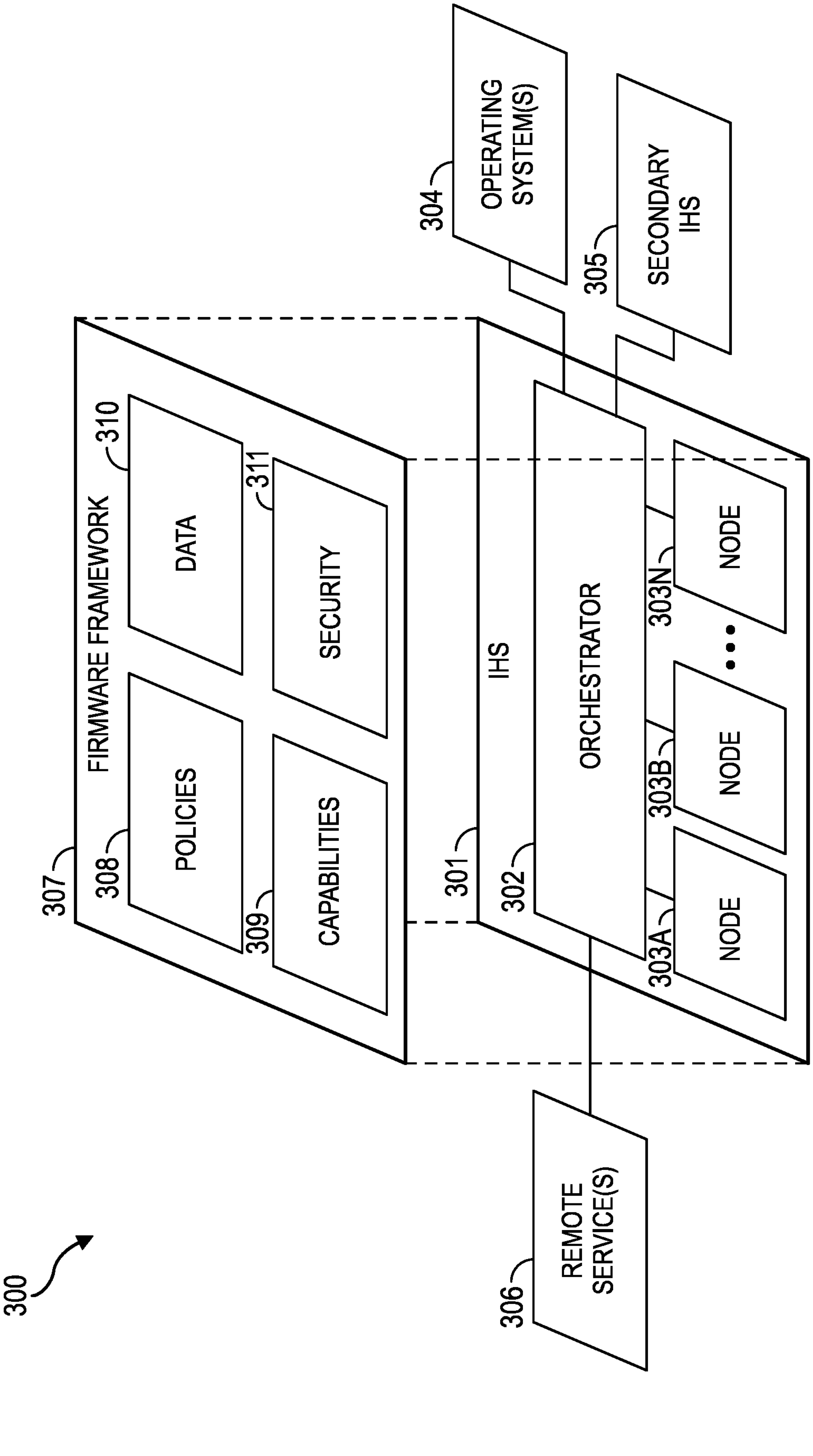
FIG. 3 is a diagram illustrating an example of a firmware framework, according to some embodiments.

FIG. 3 is a diagram illustrating an example of architecture 300 upon which firmware framework 307 may be instantiated through the execution of firmware by a plurality of devices or components (e.g., controllers, processors, processing cores, etc.), such as those shown in FIGS. 1 and 2. As described, IHS 301 includes at least two types of participants: orchestrator 302 and nodes 303A-N.

Orchestrator 302 may serve as a Root-of-Trust (RoT) for firmware framework 307. Meanwhile, nodes 303A-N provide capabilities owned within firmware framework 307. For example, in IHS 100 equipped with heterogeneous computing platform 200, EC 109/215 may implement orchestrator 302 and any of devices 201-216 may implement any of nodes 303A-N.

Orchestrator 302 may also be in communication with any number of firmware framework consumers. As shown in architecture 300, consumers may include: OS(s) 304 (executed by host processor 101), secondary IHS 305, and remote service(s) 306. In some cases, OS(s) 304 may be coupled to orchestrator 302 via an in-band communication channel. Secondary IHS 305 may be coupled to orchestrator 302 via a sideband communication channel. And remote service(s) 306 may be coupled to orchestrator 302 via an Out-of-Band (OOB) communication channel.

Once orchestrator 302 and nodes 303A-N execute their respective firmware, they instantiate firmware framework 307. In this case, components of firmware framework 307 include: policies module 308, capabilities module 309, data module 310, and security module 311. Each of modules 308-311 may be implemented as one or more services, such as orchestration services 601 of orchestrator 302 and node services 603 of nodes 303A-N, as described in FIG. 6 below.

Particularly, policies module 308 may include one or more policies configured to enable firmware framework 307 to operate as configured by a user, OEM, ITDM, or third-party. In some cases, policies module 308 may be responsible for configuring aspects of firmware framework 307 related to device, capability, and interface discovery and advertisement, as well settings related to security, telemetry collection, and more, as described in more detail below.

Capabilities module 309 may include operations and functions performable by firmware framework 307. Such capabilities may include operations such as advertising, broadcasting, discovering, configuring, collecting data, updating firmware, controlling power states and performance levels, accessing memor(ies) and network(s), executing AI/ML models, any device-specific operation (e.g., provided by each of nodes 303A-N), etc. Capabilities module 309 may also include an indication of the interfaces (e.g., APIs) available for consumers, orchestrators, and other nodes to access the respective capabilities of available nodes.

Data module 310 may include any data, drive, memory, and/or database handling service usable by firmware framework 307 as part of its normal operations. For example, data module 310 may include a firmware framework manifest or inventory identifying all nodes available to firmware framework 307 (e.g., orchestrator 302 and nodes 303A-N), their relevant details, and indications of their hierarchical connection topologies (e.g., parent node, child node, etc.). Data module 310 may also include telemetry data, communication data, error and diagnostics data, performance data, AI/ML model data (e.g., training data), etc.

Security module 311 may implement various security aspects of firmware framework 307. For example, security module 311 may implement firmware attestation, inter-node communications, and communications between firmware framework 307 and consumers 304-306. Operations performed by security module 311 may include, but are not limited to, data encryption, data decryption, hashing, data masking, cryptographic key pair generation, digital certificate generation and handling, authentication, verification, etc.

In various embodiments, firmware framework 307 may provide secure communication paths for all firmware communications within IHS 100, and in some cases extended to secondary IHSs or other peripheral devices coupled to IHS 100. Firmware framework 307 may deliver scalable discoverability and communication pathways without OS dependencies (e.g., drivers, agents, etc.), and it may reduce an OEM's need for custom integration designs.

In addition to providing communications across disparate devices (e.g., from different manufacturers) using standard protocols, firmware framework 307 may implement runtime modules that are reusable. Accordingly, certain capabilities (e.g., discovery, security, capabilities, status, pass-through configurations, docking, etc.) may be made standard across different types of IHSs in its firmware layer, and in a hardware and/or OS agnostic-manner.

Moreover, in some implementations, consumers 304-306 may have access to aspects of firmware framework 307 directly through orchestrator 302 (e.g., capabilities module 309, data 310 module, etc.). OS 304, secondary IHS 305, and/or remote service(s) 306 may communicate with orchestrator 302 in band, sideband, or OOB, respectively, to issue commands to selected devices, collect telemetry, update firmware, etc. through firmware framework 307.

Figure 4:
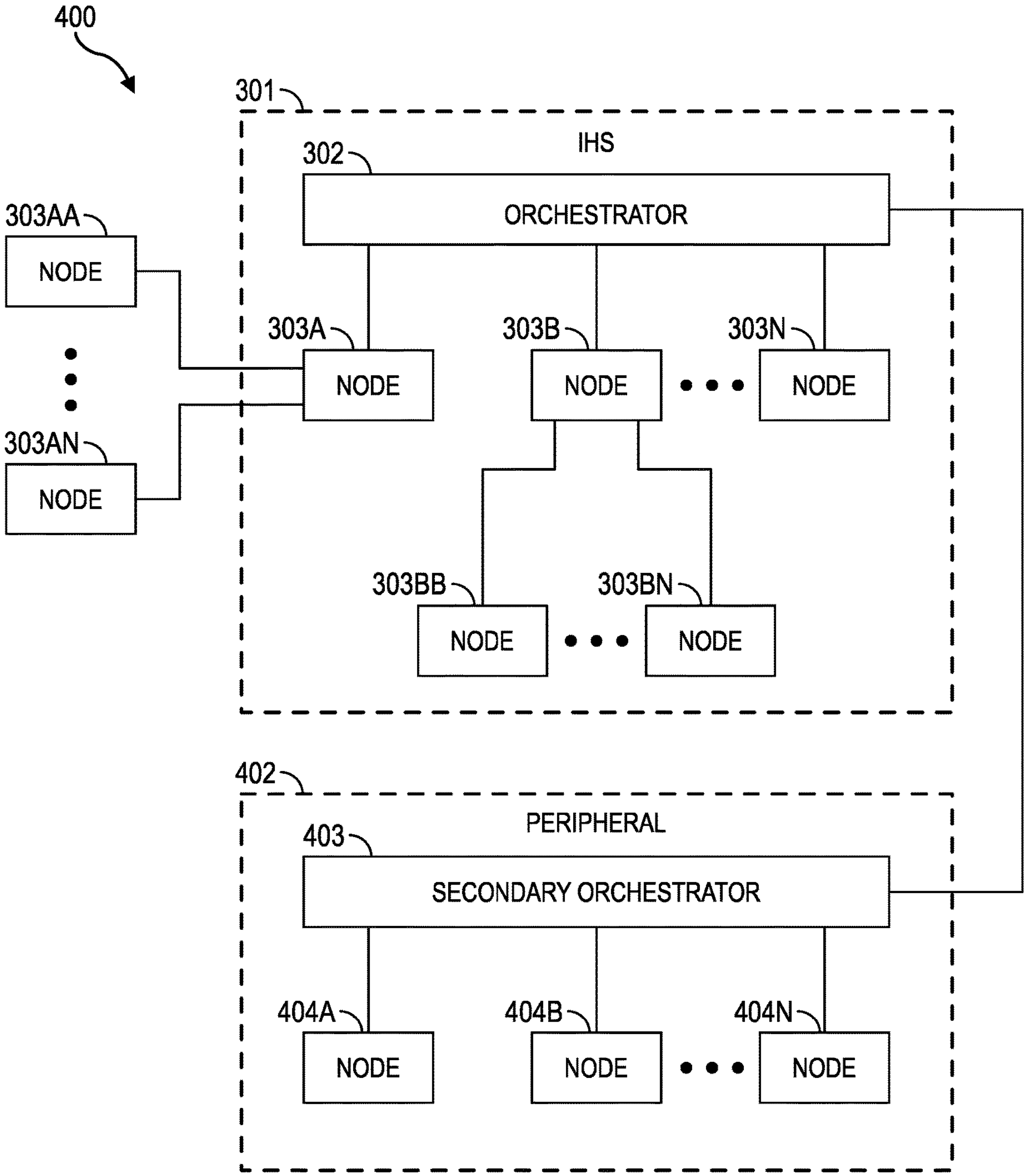
FIG. 4 is a diagram illustrating an example of a hierarchical node architecture, according to some embodiments.

FIG. 4 shows an example of a hierarchical node architecture 400 where nodes 303A-N are coupled to other nodes and orchestrators to form a larger hardware layer capable of producing firmware framework 307. It should be noted that, in general, node architectures may be application, use, and/or context specific, therefore hierarchical node architecture 400 is provided for sake of illustration only, and multiple variations are envisioned.

In this implementation, orchestrator 302 is coupled to nodes 303A-N. External nodes 303AA-AN (outside of the IHS's chassis) are coupled to node 303A, such that node 303A is a parent node ("upstream") with respect to external nodes 303AA-AN ("downstream"). Conversely, external nodes 303AA-AN are child nodes with respect to node 303A.

Connections, buses, interconnects, and communication protocols between orchestrator 302, nodes 303A, and/or nodes 303AA-AN, may follow any suitable standard. For example, in some cases, a USB controller (e.g., USB/PCIe interface 205) may implement node 303A, and any external USB device coupled to node 303A via a USB port may implement any of nodes 303AA-AN.

Nodes 303BB-BN are coupled to node 303B, such that node 303B (an "upstream" node) is a parent node with respect to nodes 303BB-AB (a "downstream" node), and nodes 303BB-BN are child nodes with respect to node 303B. In some cases, for example, sensor hub and low power AI 207 may implement node 303A, and nodes 303BB-AN may represent any internal device or sensor(s) 110 coupled to node 303B via an internal interconnect (e.g., interconnect 203), or the like.

In hierarchical node architecture 400, orchestrator 302 is also coupled to secondary orchestrator 403 of peripheral device 402. For example, peripheral device 402 may include a docking station, hub, or display comprising its own EC (like EC 109/215). Additionally, or alternatively, peripheral device 402 may include another type of processor or controller that may be configured to operate, at least in part, as an EC.

Orchestrator 302 may aggregate interfaces and capabilities reflective of nodes 303A-N and their respective child nodes (e.g., nodes 303AA-AN and/or 303BB-BN), whereas secondary orchestrator 403 may aggregate interfaces and capabilities reflective of nodes 404A-N. Parent nodes 303A and 303B may also serve as aggregators; however, in some cases, they may be bypassed by orchestrator 302 when managing child nodes 303AA-AN and 303BB-BN directly.

Orchestrator 302 may also serve as "primary orchestrator" within firmware framework 307. Particularly, orchestrator 302 may manage the operations of secondary orchestrator 402, thereby extending the number of devices participating in firmware framework 307, exposing their interfaces and capabilities, delegating (or being delegated) certain tasks, etc. For example, secondary orchestrator 402 may perform discovery operations with respect to nodes 404A-N, and it may report its own inventory and/or manifest (of child devices, capabilities, and/or interfaces) to primary orchestrator 302 for addition and/or removal of devices to/from firmware framework 307.

Secondary orchestrator 403 is coupled to nodes 404A-N, here shown as integrated or internal to peripheral device 402. In other applications, however, one or more nodes 404A-N be external to peripheral device 402.

Any node external to IHS 301, including nodes 303AA-AN as well as nodes that are part of peripheral 402 (or coupled thereto), may be added to or removed from architecture 400 while IHS 301 is operating, such that orchestrator 302 may adjust firmware framework 307 on demand, refreshing or updating the framework's capabilities, interfaces, etc., as devices are swapped in and out.

Figure 5:
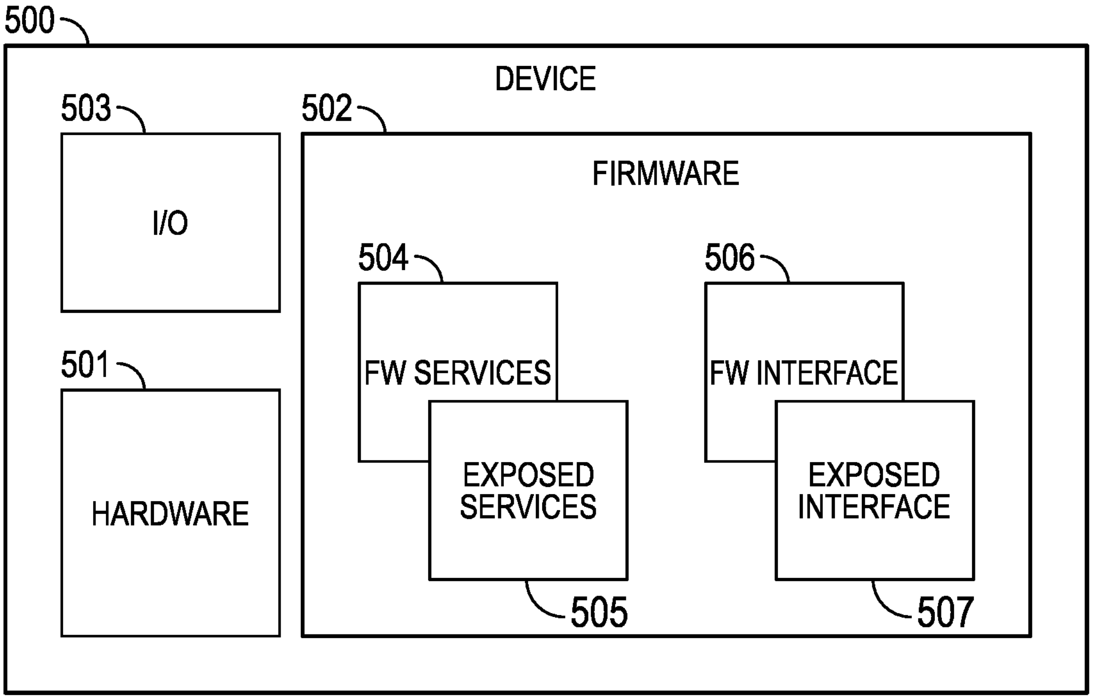
FIG. 5 is a diagram illustrating an example of an orchestrator or node usable in a hierarchical device architecture as part of the firmware framework, according to some embodiments.

FIG. 5 is a diagram illustrating an example of orchestrator 302 or node 303 ("node"). In various embodiments, node 302/303 may implement any of the orchestrators and/or nodes described above. In implementations where a single or monolithic piece of hardware (e.g., a chip) includes or otherwise operates as two or more nodes, components of node 302/303 may be apportioned or split between two or more "virtual devices," each virtual device corresponding to a respective node. In other implementations, however, two or more discrete pieces of hardware may operate together to form a single framework node.

In this implementation, node 302/303 includes device 500, which in turn includes hardware 501 and I/O 503. Specifically, I/O 503 may include any suitable port or connection responsible for communications to and from node 302/303, including messages and data exchanged as part of firmware framework 307.

Hardware 501 may include a chip, a processor, a controller, a processing core, or any suitable circuit configured to execute the operations provided by node 302/303, and it may also include a memory and other components. Moreover, hardware 501 may be configured to execute firmware instructions or code 502, and to thereby produce one or more components and/or features of firmware framework 307.

Particularly, firmware instructions 502, upon execution by hardware 501, may produce firmware services 504 and firmware interface 506.

Firmware services 504 may include functions or operations that run on, or can be executed by, device 500 to enable it to participate in firmware framework 307 as orchestrator 302 and/or nodes 303. These operations may include OEM as well as device manufacturer features such as, for example: sensor handling, telemetry collection, presence detection, shock detection, AI/ML models, routines, etc. Meanwhile, exposed services 505 may include a subset of firmware services 504 (and/or other services) responsible for executing functions and operations exposed to firmware framework 307 including orchestration services (discovery, capability, telemetry, security, etc.) and node services.

Firmware interface 506 provides an interface layer that includes methods, functions, and operations configured to enable internal and external communications into or from node 302/303 that reach into (and/or out of) firmware services 504 and/or exposed services 505. Exposed interface 507 (e.g., APIs) include a subset of firmware interface 506 (and/or other services) responsible for connecting to and supporting framework-specific interfaces, as well as for translating commands across standard communication interfaces, to/from a device's lower layer(s) to framework firmware 307.

Figure 6:
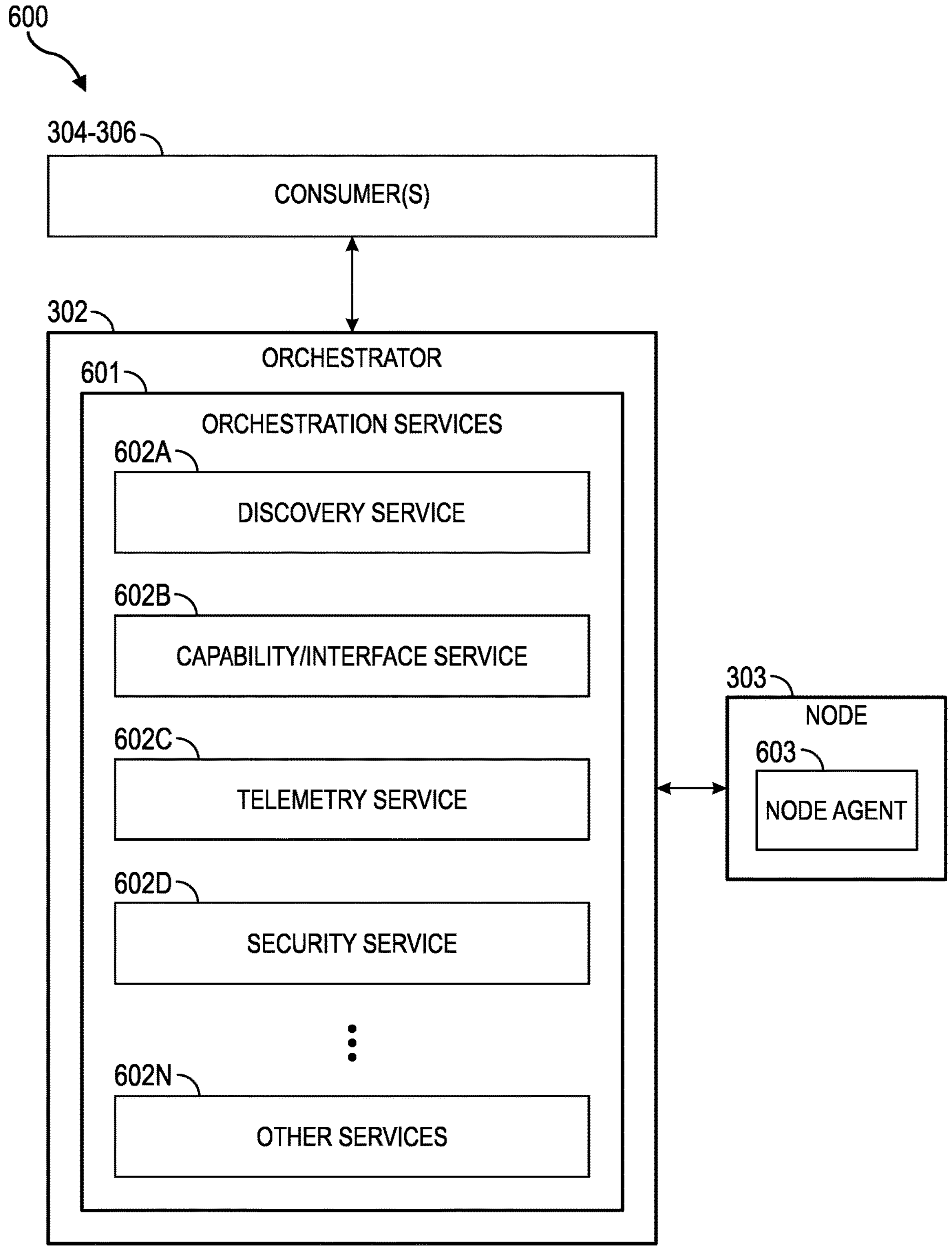
FIG. 6 is a diagram illustrating examples of orchestration services in communication with a node agent, according to some embodiments.

FIG. 6 is a diagram 600 illustrating examples of orchestration services 601 in communication with node agent 603. In this embodiment, upon execution of firmware 502 to instantiate firmware services 504 and/or exposed services 505, orchestrator 302 may provide orchestration services 601 including, for example, discovery service 602A, capability/interface service 602B, telemetry service 602C, security service 602D, and other services or agents 602N.

Meanwhile, upon execution of firmware 502 to instantiate firmware services 504 and/or exposed services 505, node 303 may provide node services or agent 603 configured to communicate with orchestration services 601 to send and receive control and/or data messages within firmware framework 307.

For example, discovery service 602A of orchestration services 601 may communicate with node agents 603 to perform one or more discovery operations (e.g., device, capabilities, interfaces, etc.). Capability/interface service 602B of orchestration services 601 may communicate with node agents 603 to perform one or more capability/interface handling operations (e.g., consolidation of capabilities in a common namespace, advertisement, access control, etc.). Telemetry service 602C of orchestration services 601 may communicate with node agents 603 to perform one or more telemetry collection, aggregation, or processing operations. Security service 602D of orchestration services 601 may communicate with node agents 603 to perform one or more security operations.

Once instantiated, consumers 304-306 may access orchestration services 601 directly through orchestrator 302, without relying on any host OS of IHS 100. Unless configured to receive or transmit private communications with certain nodes that are intended to bypass orchestrator 302, consumers 304-306 may ordinarily access any node agent 603 through orchestration services 601. Conversely, node services 404 may access consumers 304-306 through orchestration services 601; in some cases, bypassing orchestrator 302.

Figure 7:
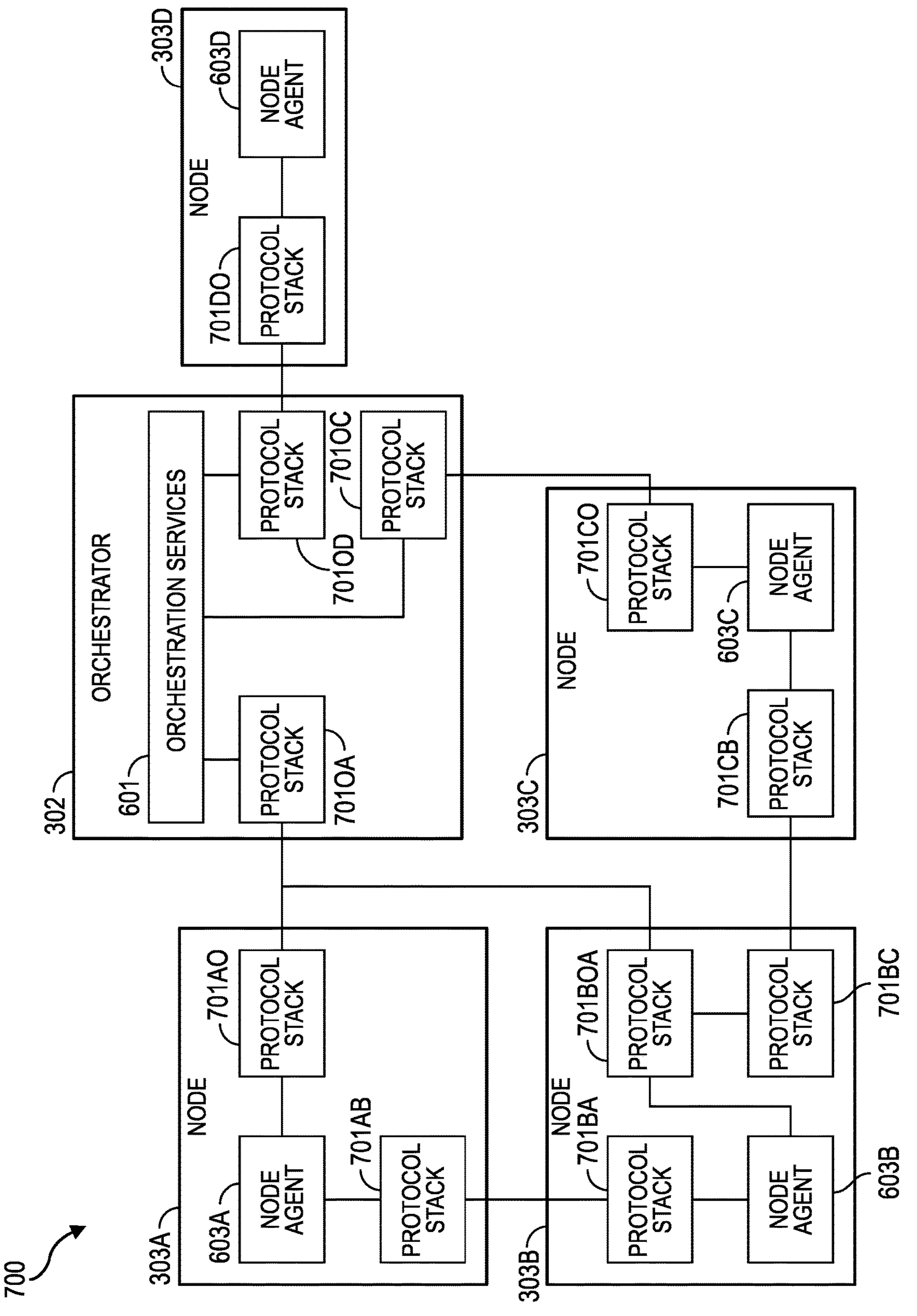
FIG. 7 is a diagram illustrating an example of a graphical representation of orchestrators and nodes participating in a firmware framework implementation, according to some embodiments.

FIG. 7 is a diagram illustrating an example of graphical representation 700 of orchestrator 302 and nodes 303A-D participating in an implementation of firmware framework 307. In this scenario, graphical representation 700 includes orchestrator 302 coupled directly to nodes 303A-D. Node 303A is coupled to node 303B, and node 303B is coupled to node 303C.

Specifically, orchestrator 302 executes orchestration service 601 in firmware, while each of nodes 303A-D instantiates its own node agent 603A-D. Orchestration services 601 may use: (i) protocol stack 701OA to communicate with protocol stack 701AO used by node agent 603A of node 303A; (ii) protocol stack 701OA to communicate with protocol stack 701BOA used by node agent 603B of node 303B; (iii) protocol stack 701OC to communicate with protocol stack 701CO used by node agent 603C of node 303C; and/or (iv) protocol stack 701OD to communicate with protocol stack 701DO used by node agent 603D of node 303D.

Node 303A uses protocol stack 701AO to communicate with protocol stack 701OA of orchestrator 302, and it uses protocol stack 701AB to communicate with protocol stack 701BA of node 303B. Meanwhile, node 303B uses protocol stack 701BOA to communicate both with protocol stacks 701AB of node 303A and protocol stack 701OA of orchestrator 302, and it uses protocol stack 701BC to communicate with protocol stack 701CB of node 303C.

Node 303C uses protocol stack 701CO to communicate with protocol stack 701OC of orchestrator 302, and it uses protocol stack 701CB to communicate with protocol stack 701BC of node 303B. Moreover, node 303D uses protocol stack 701DO to communicate with protocol stack 701OD of orchestrator 302.

In some cases, protocol stacks 701OA, 701AO, and 701BOA may include a first communication protocol, protocol stacks 701AB and 701BA may include a second communication protocol, protocol stacks 701BC and 701CB may include a third communication protocol, protocol stacks 701OC and 701CO may include a fourth communication protocol, and protocol stacks 701OD and 701DO may include a fifth communication protocol. The first, second, third, fourth, and fifth communication protocols may be different from each other.

For example, the first protocol may be $I^2C$, the second protocol may be $I^3C$, the third protocol may be USB, the fourth protocol may be a wireless protocol (e.g., Bluetooth), and the fifth protocol may be eSPI.

In some cases, each of protocol stacks 701 may be selected by orchestration services 601 based upon policy and/or context. For example, in situations where multiple protocol stacks may be available for a same inter-node connection, orchestration services 601 may direct each participating node 303 to instantiate a selected protocol stack depending upon the type of node, the present utilization of alternative communication paths, a battery charge level of IHS 100, a location of IHS 100, a security posture of IHS 100, a performance state of IHS 100, or any of the contextual information or state described herein.

Each of node agents 603 may communicate with orchestrator services 601 and other agents 303 as part of a session. Each session may be established based upon policy and/or context, and without the participation of any OS. For example, any given node 303 may be part of firmware framework 307 only for the duration of its established session.

In some cases, two or more orchestration services 601 may communicate using the same protocol stack. In other cases, each orchestration service 601 may communicate with node services 602 using a different protocol stack. In yet other cases, a single orchestration service 601 may use two or more protocol stacks concurrently.

Graphical representation 700 may be stored in data module 310 of firmware framework 307, for example, in the form of a table that identifies each node, node agent, protocol stack, and the topology of the connections between nodes. As such, graphical representation 700 may be displayed on an ITDM/OEM/user's display when evaluating the current state of firmware framework 307 (e.g., participating nodes, capabilities, interfaces, security posture, etc.)

In some cases, upon completion of a discovery process (described below), graphical representation 700 may also indicate (e.g., with colors, labels, etc.) whether a given node is classified as an aggregator node, collector node, or a node to be bypassed (a "bypass node") during message exchanges across firmware framework 307.

Figure 8:
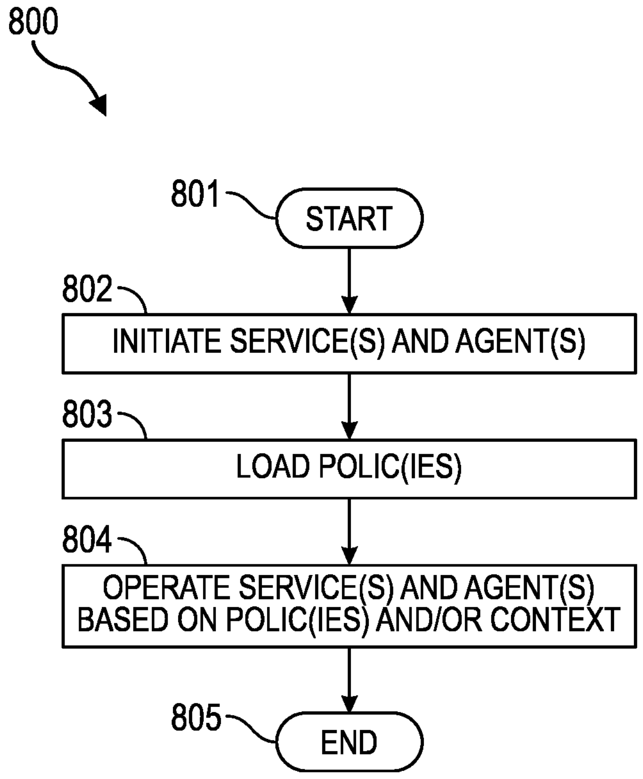
FIG. 8 is a flowchart of an example of a method for operating orchestration services and node agents as part of a firmware framework, according to some embodiments.

FIG. 8 is a flowchart of an example of method 800 for operating orchestration services 601 and node agents 603 as part of firmware framework 307 to produce modules 308-311. Method 800 starts at 801.

At 802, orchestrator 302 initiates orchestration services 601 and node 603 initiates node agent 603, respectively, by executing their respective firmware instructions 502. At 803, orchestrator 302 may load a policy, such as a discovery, capability, interface, telemetry, data, communication, or security policy. At 804, orchestrator 302 may operate any orchestration service 601 while enforcing such polic(ies).

Each policy may include rules that depend upon context (e.g., sensor data, TPPA data, IHS configuration data, device usage data, power state, performance data, location, network metrics, etc.), therefore allowing OEMs and ITDMs to enable any number of intelligent productivity, security, and value-added features within firmware framework 307 dynamically and without relying on the operation of any OS. Method 800 ends at 805.

Discovery

In some applications, certain IHS operations may rely upon interactions between two or more devices or components. For example, in certain situations, sensors 110 may include an Ambient Light Sensor (ALS), and the brightness of display 111 may be automatically adjusted in response to changes in ambient light. In other situations, an IHS's cooling fans may be configured to respond to a display's current resolution, color depth, or frame rate.

In a conventional IHS, EC 109/215 would require one or more custom sideband General Purpose I/Os (GPIOs) and/or OS agents to discover these devices and to enable communications between them. In contrast, firmware framework 307 may discover participating nodes directly, via firmware, and without interference from OS agents or dedicated GPIOs.

In various embodiments, firmware framework 307 may be configured to execute discovery service 602A as part of orchestration services 601. Discovery service 602A may identify which orchestrators and nodes may join and become part of firmware framework 307. Discovery service 602A may also produce a firmware framework manifest of all participating orchestrators and nodes, with identification details (e.g., serial number, type of device implementing a given node, etc.) as well as their available capabilities and interfaces. The firmware framework manifest may also indicate hierarchical relationships or architectural topologies between orchestrators and nodes.

Discovery service 602A may be configured to communicate with all nodes via scaled interfaces (e.g., $I^2C$, SPI, $I^3C$, etc.) between orchestrator 302 and those nodes. Meanwhile, each node 303 may execute its own firmware to instantiate its own node agent 603 within firmware framework 307. Node service or agent 603 may be configured to operate in conjunction with discovery service 602A, for example, by responding to requests (or by broadcasting its own discovery messages) to enable orchestrator 302 to enumerate (and advertise, within firmware framework 307) its capabilities and interfaces.

Discovery service 602A may be responsible for device communication and querying of system states to node services or agent 603. In some cases, node services or agent 603 may broadcast node information to the discovery service via exposed interface 507. Additionally, or alternatively, discovery service 602A may issue discovery requests to node services or agent 603, and it may receive discovery responses from it, also via exposed interface 507.

The discovery responses by a node services or agent 603 may include, but are not limited to: an identifier, a serial number, a service tag, a type of device, capabilities (e.g., functions, operations, transactions, calls, etc., that the device is configured to perform), interfaces (for accessing the capabilities), etc. In some cases, node information provided by a parent node may also include node information of child nodes downstream from the parent node.

Discovery service 602A may then consolidate discovery responses from all node services or agents 603 of all nodes, and it may assemble them to produce a manifest or inventory of all connected devices and available capabilities within firmware framework 307. This manifest or inventory and associated data may be stored in and/or handled by data module 310.

In some cases, discovery service 602A may enforce a policy provided by policies module 308. The policy may be expressed in any suitable format (e.g., Extensible Markup Language or "XML," JavaScript Object Notation or "JSON," etc.), and it may include rules for discovering devices and/or types of devices (e.g., orchestrators or nodes). Policy rules may prescribe, for example, whether a discovery process should happen by polling or broadcast, a polling order or method, a choice of selected one of a plurality of available communication buses or protocols for discovery messages, etc.

In some cases, such policy rules may be provided by an OEM or ITDM, and/or may be selected by a user of IHS 100. Moreover, these rules may be context-based (e.g., different rules may apply depending, for example, upon the IHS's power state, battery charge, whether the IHS is moving, a location of the IHS, a time of day, weather conditions, bag or lid state, IHS posture or form factor, calendar information of a user of the IHS, or any other contextual information or state described herein).

Node agent 603, when executed by a respective one of nodes 303A-N, 303AB-AN, 303BA-BN, 403, and/or 404A-N, may communicate with discovery service 602A via a protocol or bus, which may be selected dynamically and/or by policy. Node agent 603 may transmit messages indicating its exposed capabilities and interfaces to discovery service 602A, as well as any connected and/or available child nodes and their configurations. In cases where primary orchestrator 601 discovers secondary orchestrator 403 (or vice-versa), these orchestrators may each have their own discovery services, which may communicate with each other similarly as discovery service 602A and node agent 603.

In some implementations, communications sent to or from node agent 603 may be in a scaled package that presents a full list of device information, capabilities, interfaces, etc. For instance, in response to a discovery request by discovery service 602A, consider the discovery response example below provided by node agent 603 of a node implementing a presence detection sensor (e.g., one of sensors 110), presented in a JSON format:

```
{
"comments": "API spec for Core IPC Object", //internal IPC methods
"auth_token": "rt12342d",
"container_id": "abcd",
"platform_id": "p5435",
"conditions": [{
  "type": "IPC",
  "handle to policy": "void *ptr",
  "IPCMethod": "UNIX", //example
  "IPCVersion": "XX",
  "registered object auth tokens": ["t1", "t2",....]
  }, {
  "type": "sensors",
  "Devicetype": "presence",
  "presencetype": "face",
  "presence": "engaged",
  "attention": "disengaged",
  "distance": "50cm",
  }]
}
```

As discovery service 602A collects responses from various nodes 303A-N, 303AB-AN, 303BA-BN, 403, and/or 404A-N, it may assemble a firmware framework manifest of all within firmware framework 307.

For instance, consider a firmware framework manifest example produced by the discovery service and presented below without specific formatting (for simplicity):

```
- System
  - IHS Information
- Orchestrator
```

-continued

```
    - INFO: ID / Info / Version / etc.
    - Device Capabilities
      - Cap_1
        - Type: Get/SET/Execute/Listen
        - Schema: details of function call
      - Cap_2,
      - Cap_3,
  - Child nodes
    - Child_Dev1
      - INFO: ID / Info / Version / etc.
      - Device Capabilities
      - Child nodes
        - Child_Dev1
        - Child_dev2
    - Child_Dev2
      - ....
    - Child_Dev3
      - ....
    - Child_Dev4
      - ....
```

Figure 9:
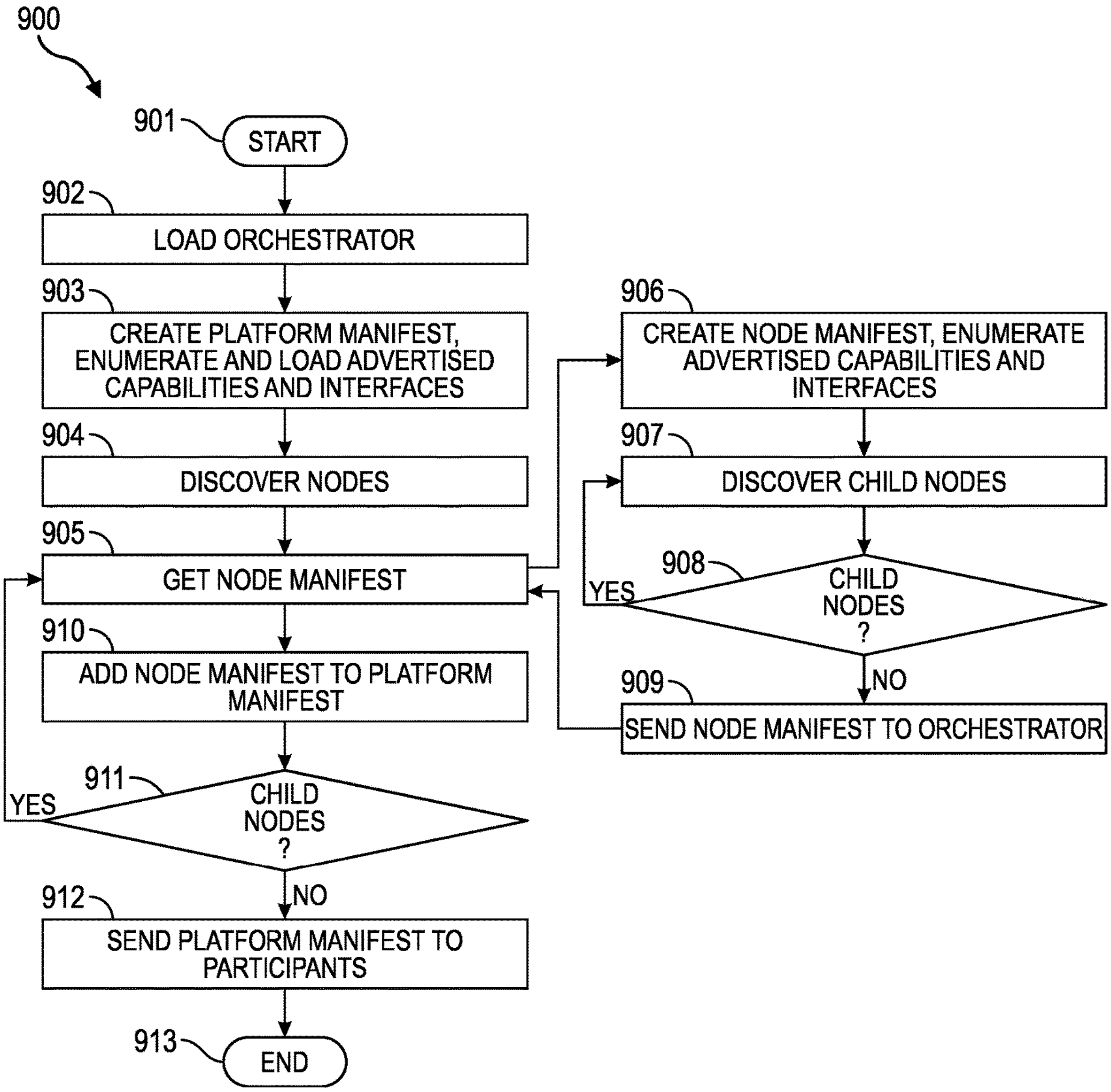
FIG. 9 is a diagram illustrating an example of a method for discovery operations, according to some embodiments.

FIG. 9 is a diagram illustrating an example of method 900 for discovery operations. In various embodiments, method 900 may involve interactions between firmware services instantiated by orchestrator 302, such as discovery service 602A, and nodes 303A-N, 303AB-AN, 303BA-BN, 403, and/or 404A-N, such as node agent 603.

Method 900 may take place within firmware framework 307 without any involvement by any OS 304, OS driver, or OS agent. In some cases, firmware framework 307 may operate in the absence of any OS, or before any OS boots (or completes its startup/wakeup processes). To that end, method 900 may be performed over interconnect 203 and/or other standard communication buses and protocols, without relying on custom GPIOs for inter-device/node communications.

In operation, method 900 begins at 901. At 902, orchestrator(s) 302 and/or 403 execute their respective firmware 302 to instantiate discovery service 602A as part of capabilities module 309 of firmware framework 307. At 903, discovery service 602A creates a firmware platform manifest and enumerates and loads advertised capabilities and interfaces.

At 904, discovery service 602A may discover nodes participating in firmware framework 307, at least in part, by polling devices with one or more discovery requests, or by receiving device information broadcast by such devices.

At 905, a node may collect and/or provide a device manifest describing information of any child device coupled to it. Particularly, at 906 the device may create such a device manifest and enumerate advertised capabilities. At 907, the node may discover child devices coupled to it, at least in part, by polling those child devices with one or more discovery requests, or by receiving device information broadcast by such child devices. At 908, if there are more child devices, control returns to 907. Otherwise, at 909, the node sends its device manifest to orchestrator(s) 302 (or a parent node).

At 910, orchestrator(s) 302 adds the device manifest to the firmware platform manifest. At 911, orchestrator(s) 302 determines if there are more child devices to be discovered. If so, control returns to 905. Otherwise, at 912, orchestrator(s) 302 sends the platform manifest to the discovered devices, and method 900 ends at 913.

In some embodiments, operations 905-909 may be performed, recursively, for all parent/child devices in a hierarchical architecture, such that, any time an orchestrator or parent node is discovered, that child device gathers its own child device manifest containing information related to other devices found downstream from it. Each child device then sends a child device manifest to its respective parent device, until the device manifest reaches orchestrator 302 and is added to the overall, firmware platform manifest.

As such, method 900 provides a dynamic, scalable mechanism for dynamically discovering connected devices participating as nodes 303 in firmware framework 307, by orchestrator 302, and in the absence of custom connection patterns.

In some cases, an IHS's OEM may wish to control one or more of an IHS's devices or components based upon the IHS's Thermal, Power, Performance, or Acoustic (TPPA) information or state. For example, the OEM may wish to control the power consumed by host processor 101 depending upon whether IHS 100 is on a desk or on the user's lap (e.g., determined using a gyroscope as one of sensors 110) or any other contextual information or state described herein. In other cases, if IHS 100 has its lid closed and is put in a bag without entering a sleep state, thermal conditions may become actionable.

Accordingly, method 900 may also collect TTPA information (e.g., device temperature, power state, power consumption information, battery data, performance metrics, sound pressure level or cooling fan speeds, etc.) from available orchestrators and nodes as part of the discovery process. The TTPA information may be used to detect conditions or anomalies, and to take corrective action (without involvement by any OS), following a TPPA policy stored in policies module 308.

Such TPPA policy may be enforced by orchestrator 302 as part of its normal operations. In some cases, the TPPA policy may prescribe the type of TPPA information to be queried or otherwise collected from a given device to build the platform framework manifest.

For example, in response to a discovery request by orchestrator 302, consider the discovery response example below provided by node agent 603 of a node implementing host processor 101, presented in a JSON format:

```
{
"comments": "CPU Perf and Power Information",
"auth_token": "rt12342d",
"container_id": "abcd",
"platform_id": "p5435",
"specifications": [{
  "type": "Cores",
  "PerfCores": "8",
  "EfficientCores": "6",
  "HyperThreadingEnabled": "True",
  "PerfCoreMaxTurboFrequency": 5000",
  "EfficientCoreMaxTurboFrequency": 3700"
  }, {
  "type": "Power",
  "Devicetype": "CPU",
  "InterfaceType": "MMIO",
  "PowerReportingMetric": "Watts",
  "BasePower": "15",
  "MinimumAssuredPower": "12",
  "MaxTurboPower": "55"
  }]
}
```

In various embodiments, firmware framework 307 may provide for the discovery of capabilities of each device participating as orchestrators or nodes. These capabilities may represent one or more exposed node services 505, which may then be collected, advertised, distributed, or otherwise made available to other nodes as part of capabilities module 309 within firmware framework 307.

Consider a situation where a user's IHS 100 is managed by an enterprise (e.g., an ITDM, an IT administrator, etc.). When the user moves IHS 100 between different workstations or workspaces, each workspace having different external and peripheral device available, at any given time an ITDM may wish to identify the user's entire workspace, including all node capabilities and interfaces.

In a conventional IHS, however, OS restrictions would prevent an ITDM from discovering every device or component in IHS 100. Moreover, even when a device or component is discovered, the ITDM would not have an interface available through which to access the device without going through the IHS's OS.

In contrast, using firmware framework 307, an ITDM may send an inventory or manifest retrieval command or request from a remote management console application executed by remote service(s) 306 directly to orchestrator 302 (e.g., EC 109/215) via an OOB communication channel. Orchestrator 302 may communicate with any downstream node and/or secondary orchestrator to fulfill the command or request without any interference by any OS.

For example, rather than setting an alert (e.g., a thermal alert) at the OS level, an ITDM's command, request, or policy may set the alert for a selected sensor or device directly in firmware, using capabilities 309 advertised for firmware framework 307.

In some embodiments, orchestrator services 601 may include capability/interface service 602B. Within firmware framework 307, capability/interface service 602B may advertise capabilities 309 (e.g., exposed services 505 from all orchestrators and nodes), provide 'get' and 'set' interfaces or APIs (e.g., exposed interfaces 507 of all orchestrators and nodes), and advertise or otherwise distribute those capabilities/interfaces across orchestrators, nodes, and consumers. Capability/interface service 602B may be integrated into, or distinct from, the firmware framework's discovery services 602A.

Again, node agent 603 may be configured to respond to a discovery request with a response that lists the exposed capabilities and interfaces of a given node. In cases where the node is a parent node, the parent's node response may list every exposed capability and interface of its child nodes.

Meanwhile, capability/interface service 602B may be executed in firmware by orchestrator 302 (e.g., EC 109/215), as part of orchestration services 601, and it may be responsible for handling a node's discovered capabilities and their interfaces.

Node agent 603 may also be configured to fulfill requests and execute commands received via exposed interface 507 to reach in and out of exposed services 505. In some cases, each exposed service 505 of each device 500 implementing orchestrator 302 and/or node 303 may be surfaced as an individual capability of capability module 309. Similarly, each exposed interface 507 of each device 500 implementing orchestrator 302 and/or node 303 may be surfaced as an individual interface of capability module 309.

In operation, when IHS 100 is powered on, discovery service 602A polls (or receives broadcasts) directly from other orchestrators or nodes with discovery information, which may include a capabilities and interfaces list, without requiring the participation of any OS (e.g., OS 304). When capability/interface service 602B receives a node's responses through discovery service 602A, it caches a list of exposed capabilities and interfaces from that node, in capabilities module 309, and still without requiring the participation of any OS. Then, capability/interface service 602B distributes the list of available capabilities to other nodes, and each node which may invoke those capabilities using their respective interfaces, in some cases subject to access controls, again without requiring the participation of any OS.

In some cases, orchestration services 601 may implement access control mechanisms defined by policies module 308. For example, in some cases, a policy may provide that certain types of capabilities may be accessible to some nodes (or types of nodes) and not others. Additionally, or alternatively, these mechanisms may require certain types of node access to be performed via a selected interface, and not another interface. If two nodes have redundant capabilities exposed, for example, orchestration services 601 may select a first node to provide its capabilities to a first set of nodes or consumers, and a second node to provide its redundant capabilities to a second set of nodes or consumers, based on context information or state(s).

When a node is added to firmware framework 302 (e.g., an external device is added to a USB port, or a device finishes a firmware update and reboots, etc.), discovery service 602A may collect the node's exposed capabilities and interfaces and add them to the firmware framework manifest. Then, capability/interface service 602B may advertise or distribute those capabilities and interfaces across firmware framework 302. When the node is removed from firmware framework 302 (e.g., an external device is unplugged, etc.), discovery service 602A may remove the node's exposed capabilities and interfaces from the firmware framework manifest, and capability/interface service 602B may stop advertising or distributing those capabilities and interfaces across firmware framework 302.

In some cases, with respect to capabilities exposed by a given node, policies module 308 may include access control rules based, at least in part, upon: last date of a firmware update or version of the node; a determination of whether the node is integrated into heterogeneous computing platform 200 or external to it, or whether a node is enclosed within IHS 100 or external to it; a determination of whether the node is part of a docking station, hub, or external display; the ownership of the node (e.g., user vs. enterprise); a physical or geographic location of the node; a performance configuration setting of IHS 100; a power state of IHS 100; a consumer or type of consumer (e.g., 304-306), or any contextual information or state described herein.

In some cases, access control mechanisms may also determine which entity with firmware framework 307 enforces or oversees such access control. For example, in some cases, orchestration services 601 of orchestrator 302 may enforce access control by selectively advertising certain capabilities/interfaces, by denying, timing out, or not forwarding commands or requests that run afoul of access control rules (e.g., because a requesting node or consumer is not authorized to make such a request), etc. In some cases, the determination of which orchestrator or node enforces a given access control mechanism may be based upon any of the contextual information or state discussed herein.

Additionally, or alternatively, however, access control mechanisms may operate based on AI/ML models that receive contextual information or state and determine, based upon training data, whether to provide or block certain capabilities and/or interfaces to/from specific orchestrators, nodes, and/or consumers.

If OS 304 (or other consumer 305 or 306) requests a node's capabilities details from firmware framework 307 via orchestrator 302, capability/interface service 602B may share access to the capability with OS 304 (e.g., an OS agent/driver), subject to one or more access control rules enforced by orchestration services 601 based on policy module 309. Additionally, capability/interface service 602B may communicate available interfaces to OS 304 for accessing the advertised or requested capabilities (e.g., APIs for "get" and "set" operations).

For example, consider an example of a discovery/capabilities request issued by orchestrator 302 (e.g., EC 109/215) as part of the operation of capability/interface service 602B, to a temperature sensor (e.g., one of sensors 110), as presented below in JSON format:

```
{
"auth_token": "2YotnFZFEjr1zCsicMWpAA",
"container_id": "abcd",
"platform_id": "p5435",
{
  "auth_token": "your_api_key_here",
  // Replace with your actual authentication
  "request_type": "capabilities_and_interfaces",
  "source_ic": "IC1",
  "destination_ic": "IC2",
  "timestamp": "2023-09-02T10:30:00Z"
}
```

In this example, a discovery/capabilities response sent by node agent 603 running on the temperature sensor may include its available capabilities and interfaces, as follows:

```
{
  "response_type": "capabilities_and_interfaces",
  "source_ic": "IC2",
  "destination_ic": "IC1",
  "timestamp": "2023-09-02T10:35:00Z",
  "capabilities": [
    {
      "name": "Temperature",
      "description": "Provides temperature
      readings in Celsius and Fahrenheit",
      "interfaces": [
        {
          "name": "GET",
          "description": "Retrieve temperature readings"
        }
      ]
    },
    {
      "name": "Thermal Limit",
      "description": "Allows setting a thermal limit for alerts",
      "interfaces": [
        {
          "name": "SET",
          "description": "Set the thermal limit"
        }
      ]
    }
}
```

As such, a capability/interface service 602B may be configured to handle all nodes' capabilities, and to distribute or advertise those capabilities across firmware framework orchestrators and nodes in a workspace.

Ordinarily, using conventional techniques, a BIOS engineer would have to create a specific device object for each node and expose it to the OS. In contrast, using firmware framework 307, capability/interface service 602B may make their exposed capabilities available to other devices, orchestrators, and/or consumers independently of the state of any host OS.

Moreover, these systems and methods provide the ability to insulate calling applications and node agents 303 from a node's underlying functionalities via common interface definitions agnostic of chipset, platform, line-of-business, or host OS. These systems and methods may be scalable across disparate protocols (e.g., $I^2C$, USB, MIPI, etc.), payload types (e.g., stream/real-time, events, messages, etc.), node types (e.g., On-the-Box or "OTB" versus external devices), and/or node topology (e.g., daisy-chaining, star, mesh, etc.).

Telemetry

In some applications, an ITDM may wish to collect raw telemetry data from IHS 100. Conventionally, an ITDM would not be able to perform many such tasks with existing OS tools due to restrictions put in place by OS developers. Even if some telemetry data were available, there would be no scalable manner to collect, process and optimize the collection of telemetry data from IHS devices via direct connections and/or without an OS agent's assistance.

In contrast, orchestrator 302 within firmware framework 307 may be configured to instantiate telemetry service 602C as part of its orchestration services 601. Telemetry service 602C may be responsible for enumerating and advertising telemetry capabilities, and handling telemetry settings based on defined and optimized communication paths, protocols, and/or policies. Because telemetry service 602C operates in firmware, orchestrator 302 is capable of handling telemetry operations independently of OS 304 and/or its state.

Particularly, telemetry service 602C may be configured to collect all telemetry capabilities and interfaces of all orchestrators and nodes coupled to firmware framework 307 (e.g., part of exposed services and interfaces 505 and 507). Telemetry service 602C may also be responsible for distributing telemetry capabilities and interfaces to all orchestrators and nodes.

In operation, telemetry service 602C may independently prioritize and scale communications to/from each telemetry data point, including orchestrators and nodes, to propagate the data through each node, and to deliver payload requests to a final endpoint.

Meanwhile, node agent 603 may be configured to manage node 303's telemetry collection and respond to telemetry requests. Node agent 603 may collect all downstream telemetry data points advertised for child nodes with performance optimizations.

Node agent 603 may include a telemetry queue responsible for performing local orchestration operations for child nodes, as well as for configuring and/or requesting telemetry inputs from connected nodes (i.e., similarly as functions as telemetry service 602C, except telemetry service 602C is a system-wide collector/orchestrator whereas node agent 603 is a child node present as a subcomponent into telemetry service 602C's prioritization schema). Node agent 603 may also be configured to perform telemetry pass-through operations and communications with all of node 303's child nodes.

When the telemetry consumer is OS 304, secondary IHS 305, or remote service 306, those consumers may include a respective service configured to initiate in-band, sideband, or OOB collection routines and obtaining telemetry data from telemetry service 602C for processing and collection.

In some cases, once a telemetry collection request is received by telemetry service 602C, telemetry service 602C may orchestrate execution of the request by identifying relevant collector node(s) (i.e., a node in charge of collecting telemetry data), aggregator node(s) (i.e., a parent node in charge of aggregating telemetry data collected by two or more child nodes), or bypass node(s) (i.e., a node that merely forwards requests and responses to upstream or downstream nodes without otherwise processing the request or response) for fulfilling the request.

How telemetry service 602C classifies a node (e.g., collector, aggregator, or bypass) may depend upon the type of telemetry collection (e.g., sensor readings, processor utilization data, etc.), the amount or size of the data being/to be collected, the available paths and protocols between nodes the power state of IHS 100, the location of IHS 100, etc.

Telemetry service 602C may maintain a list of all telemetry capabilities accessible through available interfaces. As such, telemetry service 602C may route incoming telemetry requests to appropriate collector nodes, while setting one or more of the collector nodes' parent nodes as aggregators and/or bypass nodes and/or selecting communication paths or protocols depending upon a telemetry policy stored in module 308 of firmware framework 307. Conversely, telemetry service 602C may route outgoing telemetry responses to appropriate consumers 304-306 (or other orchestrators and nodes) following the telemetry policy.

In some cases, policy rules that govern telemetry collection, path and protocol selection, node classification and configuration (e.g., collector, aggregator, bypass, etc.), and other settings or options may be based upon any of the contextual information or state described herein (e.g., IHS location, IHS performance or power state, current node utilization, network connection bandwidth, etc.).

For example, a telemetry policy may include certain rules that apply in normal operating situations, and other rules that apply when IHS 100 is undergoing field debug operations (e.g., under control of OS 204, secondary IHS 305, or remote service 306).

Particularly, in some applications, an OEM and/or ITDM may wish to collect debug data when there is a problem with IHS 100 in the field, and the debug data may include telemetry data (e.g., a device or component's thermal, power, performance, and/or acoustic or "TPPA" data). Conventionally, when a technician arrives at a customer's location of IHS 100, the technician may often find restrictions on the type of telemetry data that can be retrieved from which devices or components, as well as which diagnostic tools can be executed by IHS 100, for example, due to the customer's security blocks. In those cases, the technician may have to take the IHS 100 from the user to test it at the factory or lab, which means additional costs.

To address these, and other concerns, firmware framework 307 may provide an OS and/or silicon agnostic mechanism to collect telemetry data from selected nodes, particularly TPPA data (e.g., temperature, battery charge level or rate, power state, performance state, operating frequency, cooling fan speed, sound pressure level, etc.), and to store it without interference from any OS. The TPPA data may also be accessed directly by consumers 304-306 for debug operations though orchestrator 302, still without interference from any OS. Moreover, TPPA data may be made persistent across boots, via data module 310, thus leading to more accurate and faster, firmware-based debug operations.

Telemetry service 602C may be configured to collect, organize, advertise, and distribute TPPA data from/to various nodes of firmware framework 307, including external nodes 303AA-AN, or nodes 403 and 404A-N. TPPA data may also be consumed by firmware or OS-level agents via any available interface allowed by policy. Conversely, node agent 603 may be configured to collect TTPA data from its underlying hardware device and to transmit telemetry service 602C.

The TPPA data collection by node agent 603 may be configured by policy module 308 and/or it may depend upon context information. For example, when IHS 100 is communication with an ITDM's IHS (e.g., 305) or a remote console (e.g., 306), telemetry agent 602C may in response increase a data collection rate of node agent 603, and/or it may prioritize its telemetry traffic within interconnect 203, in some cases through alternative buses and/or protocols. When IHS 100 is disconnected from the ITDM's IHS or remote console, telemetry agent 602C may reduce the collection rate and/or it may deprioritize telemetry traffic within interconnect 203 in response thereto.

Security

In various embodiments, when orchestrator 302 communicates with nodes 303 and/or when nodes 303 communicate among themselves, the control and/or data messages exchanged may be secured within firmware framework 307, at least in part, through operation of security service 602D. For example, when a low-level protocol does not offer session authentication mechanisms at runtime or firmware image level integrity verification, security service 602D may add such mechanisms to firmware framework 307 in a scalable manner across different node types, protocols, and topologies.

Although in some implementations security service 602D may be provided entirely by orchestrator 302, in other implementations orchestrator 302 may use security device 212 to execute one or more security operations (e.g., create, distribute, refresh, and void session keys, etc.) to implement aspects of security service 602D.

In some cases, security service 602D may be configured to identify when an internal or external node has been removed and/or re-programmed (e.g., with malicious or untrusted firmware). For example, security service 602D may be configured to perform node firmware image verification and inter-node communications, among other security operations.

With respect to node image verification, whenever a new node is connected to firmware framework 307, security service 602D may query the node for its firmware image details (e.g., digital certificate, signature, hash, etc.). In some cases, the digital certificate may have been specifically issued for use in firmware framework 307. Security service 602D may then perform a local verification of an image hash and/or it may also verify certificate(s) and/or signature(s) details of the node's firmware image with a cloud service (e.g., remote service 306). Upon successful verification, security service 602D may enable the node's discovery and participation in firmware framework 307.

As to inter-node communications, consider a scenario where nodes 303B and 303C wish to communicate with each other, for example, to exchange control or data messages between them. In that case, node agents 603B and 603C may reach into orchestration services 601 with a connection request, and, in response to the request, orchestration services 601 may share a session key with node agents 603B and 603C, and it may distribute unique cryptographic key pairs to node 303B and node 303C.

In communications sent from node 303B to node 303C, messages may be encrypted using node 303B's private key, which node 303C decrypts using node 303B's public key. In the reverse direction, messages sent from node 303C to node 303B may be encrypted using node 303C's private key, which node 303B decrypts using node 303C's public key. After decryption, each node may verify each message for a valid session key.

In some cases, this security/encryption layer provided by security service 603C may be used in response to a determination, by discovery service 602A, that a bus/protocol used by a node to join firmware framework 307 does not have proper native security mechanisms. In other cases, when a node's bus/protocol coupled to orchestrator 302 includes its own security mechanisms (e.g., BT) orchestrator 302 may leverage that protocol's native security mechanisms to establish and maintain secure communication channels across firmware framework 307. In yet other cases, this security/encryption layer provided by security service 603C may be used in addition or as an alternative to a node's native security mechanisms.

Inter-node communications may also be secured by security service 603C in response to IHS 100 being coupled to an external device that can be added as an orchestrator (and/or node) in firmware framework 307. When the external device is coupled to IHS 100, the layer of security/encryption provided by security service 603C may be added to one or more ongoing inter-node communications. When the external device is no longer coupled to IHS 100, this security/encryption may be stopped and firmware framework 307 may rely only upon the native security mechanisms afforded by conventional buses/protocols.

If for any reason orchestration service 601 decides to pause or stop ongoing inter-node communications (e.g., based, at least in part, on any of the context information or states described herein, following contextual rule(s) prescribed by a policy), security service 602D may revoke or invalidate the previously shared session key. Also, as an additional security feature, security service 602D may periodically refresh the session-key and/or cryptographic keys of the individual nodes based, at least in part, upon any context information or state described herein, also following contextual rule(s) prescribed by a policy.

In some cases, the security posture (e.g., firmware verification status of the node, whether security service 602D is using an additional encryption layer or native bus/protocol encryption for that node, etc.) of a node participating in firmware framework 307 may be visually indicated in graphical representation 700 of orchestrator 302 and nodes 303A-D.

Referring again to FIG. 7, multiple nodes (e.g., internal nodes as well as external nodes) can be interconnected with communication links in a heterogeneous computing platform 200. Additionally, each communication link can utilize different protocols. As shown, more than one path can exist from a source node to a destination node, and the path connecting the source and destination nodes can hop across different node-types. For example, orchestrator 302 may communicate with node 303B through node 303A via protocol stacks 701OA-701AO and protocol stacks 701AB-701BA, through node 303C via protocol stacks 701OC-701CO and protocol stacks 701CB-701BC, and/or directly with the orchestrator 302 via protocol stacks 701OA-701BOA. In addition, the type of communication protocol used by each communication link may be different.

For example, protocol stacks 701OA-701AO and 701OA-701BOA may communicate using a USB protocol, protocol stacks 701OD-701DO and 701OC-701CO may communicate using a I2C protocol, while protocol stacks 701AB-701BA and 701BC-701CB may communication using a SPI protocol.

One challenge is that no conventional technique has heretofore been provided for choosing the best optimized path. Moreover, no conventional technique has heretofore been provided for choosing the best optimized path based on factors, such as message type (e.g., streaming, real-time, events, messages, etc.) or one that is scalable across the different node types. Without path optimization, a service would randomly choose a path that hurts performance and potentially leading to poor user experience.

According to embodiments of the present disclosure, the orchestrator 302 and node agents 603A-D of each node 303A-D (collectively 303) may be included with logic that is configured to communicate to adjacently connected upstream and downstream nodes for gathering information about each node. This information is transmitted to the OS agent so that it can process the information to determine an optimal path for each service provided by the orchestrator 302. The orchestrator 302 also includes logic to communicate with an OS agent (e.g., system service/daemon) running in the OS 304 for aiding in selection of an optimal path for each service used by the OS 304. For example, the orchestrator 302 may communicate with the OS agent of the OS 304 to identify a particular message type that is going to be used from one node to another so that an optimal path may be selected.

FIG. 10 illustrates an example table 1000 that may be used by the OS agent to store weight and values associated with a communication link according to some embodiments. The table 1000 include multiple rows 1002*a-f*, one for each communication link used in the heterogeneous computing platform 200. The table 1000 also include multiple columns 1004*a-e* including column 1004*a* that indicates each particular communication link, a column 1004*b* indicating a particular protocol used by the communication link, a column 1004*c* indicating properties associated with the communication link, a column 1004*d* indicating a value (v) assigned to the type of communication link, and a column 1004*e* indicating a weight (w) assigned to the type of communication link.

As shown, the communication links in the table 1000 are associated with a heterogeneous computing platform structure similar to the heterogeneous computing platform 200 of FIG. 7. Each communication link is represented as (x,y) in which node 303A is represented as '1', node 303B is represented as '2', node 303C is represented as '3', node 303D is represented as '4', and the orchestrator 302 is represented as '5'. In one embodiment, whenever a new node (e.g., node 303B) is connected to another node (e.g., node 303A), node 303A will communicate with node 303B to obtain its communication information (e.g., unique-id, connection protocol, power, bandwidth, latency, etc.), and will send the information to the OS agent. If the node 303A is not directly connected to the OS agent, it will relay the information via a connected chain of nodes.

Figure 11:
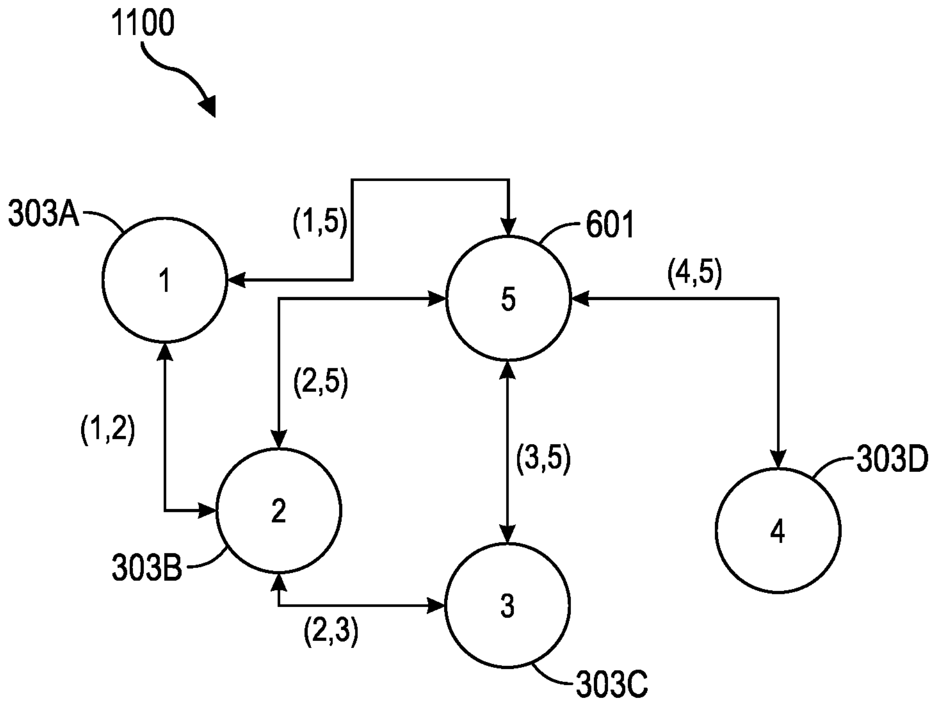
FIG. 11 illustrates an example graph that may be generated by the OS agent according to some embodiments.

FIG. 11 illustrates an example graph 1100 that may be generated by the OS agent according to some embodiments. The OS agent may construct the table 1000 and graph 1100 whenever a discovery process is performed to identify the nodes configured in the heterogeneous computing platform 200. For example, the OS agent may construct the table 1000 and graph 1100 whenever the heterogeneous computing platform 200 is re-booted, or whenever a new node is detected, or an existing node is removed from the heterogeneous computing platform 200. The OS agent with the available information, such as the information stored in the table 1000, will create the graph 1100 and maintain certain weight and values associated with a communication link used by the new node (e.g., node 303B). Upon notification of the node connection event to the OS agent, it will consume the newly connected node information and build the graph. In one embodiment, the OS agent may detect an available path using a Depth First Search (DFS) algorithm, and maintain a list of multi-path node pairs (e.g., root node to node paths list). If multiple paths for any node is identified, the OS agent uses the DFS algorithm to detect the best path and cache it.

In one embodiment, the OS agent may select the optimal path that provides the maximum (max) value according to the following equation:

$$\max\left(\sum_{i=1}^{n} v_i x_i\right)$$

Where n is the total number of hops in the path, vi is the value of a connecting path (x,y), and x and y are nodes, xi is a value that can be either 0 or 1 (∈{0,1}). This denotes the connecting path (x,y) is selected ('1') or rejected ('0'). The selected path should also adhere to certain constraints according to the following equation:

$$\sum_{i=1}^{n} w_i x_i \le C$$

Wherein Wi is the weight (e.g., power usage, proportion of bandwidth capacity, etc.) of a connecting path (x,y), where x and y are nodes, and C is the maximum collective weight limit of an end-to-end path. Thus, the constraints may include one, such as the end-to-end path must support the message type (e.g., reliable/unreliable messages, etc.), and the maximum collective (cumulative paths) weight limit is less than or equal to 'C'.

Figure 12:
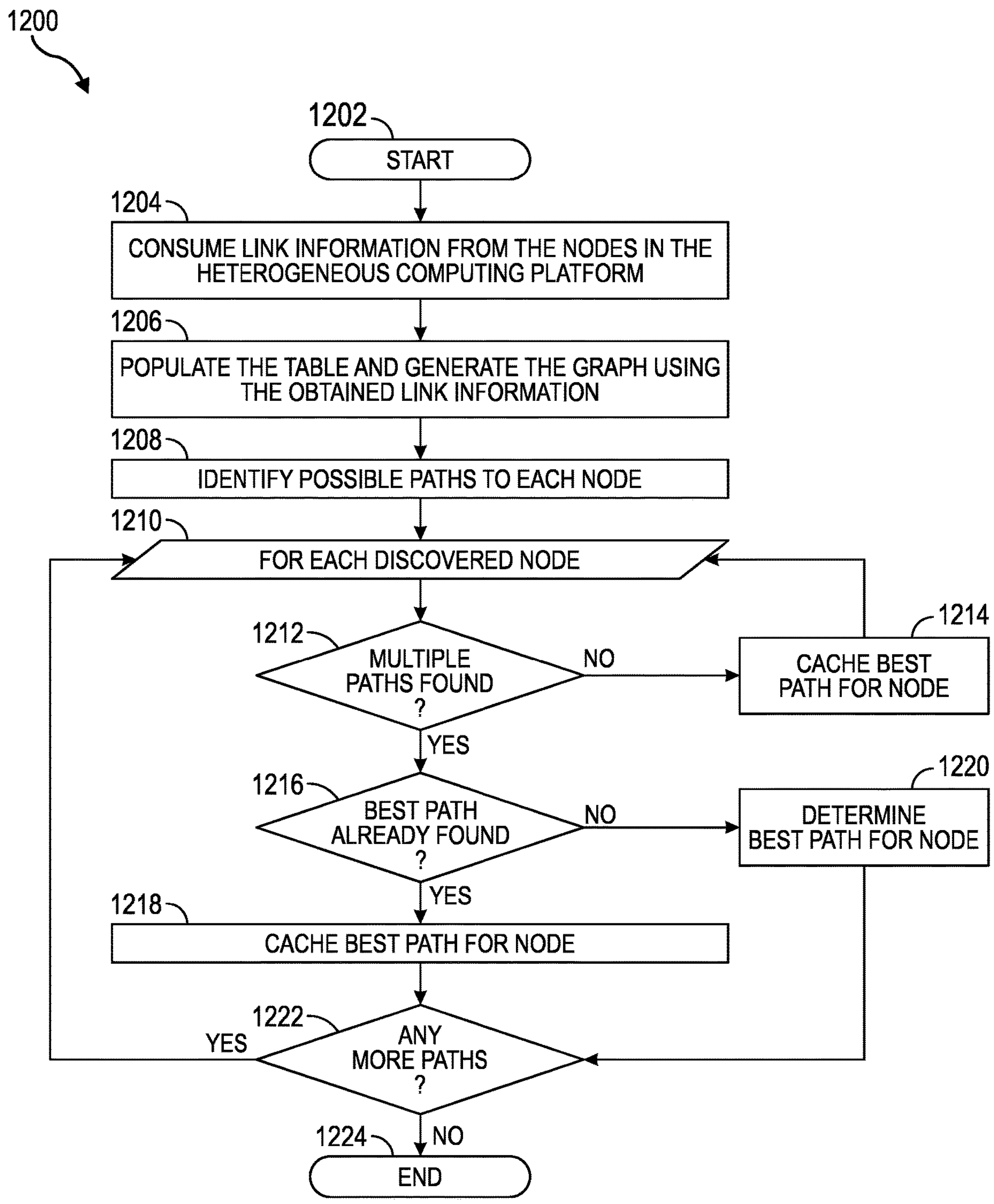
FIG. 12 illustrates an example optimal path selection method that may be performed to select an optimal path in a heterogeneous computing platform according to some embodiments of the present disclosure.

FIG. 12 illustrates an example optimal path selection method 1200 that may be performed to select an optimal path in a heterogeneous computing platform according to some embodiments of the present disclosure. Additionally or alternatively, the optimal path selection method 1200 may be performed by any device configured in the heterogeneous computing platform, such as by an OS agent running on an OS of the heterogeneous computing platform. The method 1200 may be performed at any suitable time. For example, the method 1200 may be performed the first time that the heterogeneous computing platform 200 is started up following manufacture, during a re-boot process, or whenever a node is connected to the heterogeneous computing platform 200, or an existing node is removed from the heterogeneous computing platform 200.

The method 1200 starts at step 1202. At step 1204, the method 1200 consumes link information about each of the nodes. For example, the orchestrator 302 may, upon a request from the OS agent, obtain connection details of any of its direct communication links between itself and one or more adjacent nodes. The orchestrator 302 may also instruct its immediate downstream nodes to gather link information associated with their downstream nodes, and so on until link information is obtained from all communication links in the heterogeneous computing platform 200. At step 1206, the method 1200 populates the table 1000 and the graph 1100 using the obtained link information.

At step 1208, the method 1200 identifies the possible paths to each node 303. In one embodiment, the method 1200 may use a DFS algorithm that explores the communication links associated with each node starting at the root node, which in the present case, is the orchestrator 302 until all available nodes and their associated communication links have been discovered.

Step 1210 indicates that the method 1200 is to perform steps 1212-1222 for each node 303 discovered above at step 1208. At step 1212, the method 1200 for one of the nodes 303, determines whether multiple paths exist to that node 303. If not, processing continues at step 1214 in which the method 1200 caches information about the one path to that node 303, and then continues processing the next node at step 1210. If, however, multiple paths exist to the node 303, processing continues at step 1216 in which the method 1200 determines whether the best path has already been determined for the node 303. If so, processing continues at step 1218 in which the best path for that node 303 is cached; otherwise, processing continues at step 1220 in which the method 1200 determines the best path to that node 303. In one embodiment, the method 1200 may use a DFS algorithm to determine the best path to that node 303. The method 1200 then caches the best path for that node 303 at step 1218.

At step 1222, the method 1200 determines whether any more nodes still need to be processed. If not, processing continues at step 1224 in which the method 1200 ends; otherwise, processing continues at step 1210 in which the next node 303 is processed in order to determine its best path.

Although FIG. 12 describes an example method 1200 that may be performed to select an optimal path in a heterogeneous computing platform, the features of the method 1200 may be embodied in other specific forms without deviating from the spirit and scope of the present disclosure. For example, the method 1200 may perform additional, fewer, or different operations than those described in the present examples. For another example, the method 1200 may be performed in a sequence of steps different from that described above. As yet another example, certain steps of the method 1200 may be performed by other components than those described above, such as by the orchestrator 302.

Figure 13:
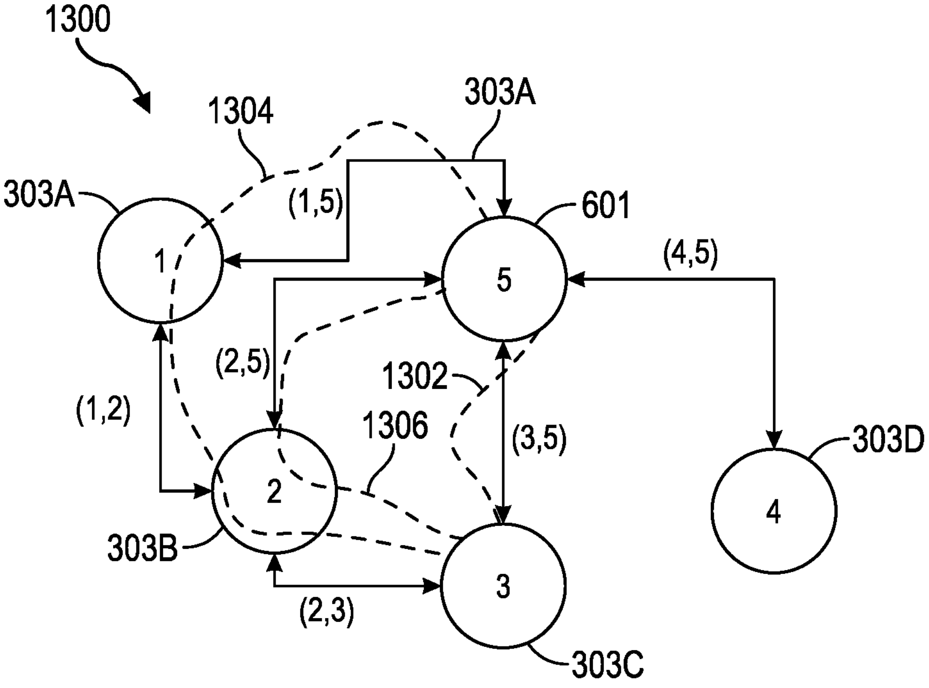
FIG. 13 illustrates an example graph showing how the optimal communication path selection system may select paths for load balancing and fault tolerance according to some embodiments.

FIG. 13 illustrates an example graph 1300 showing how the optimal communication path selection system may select paths for load balancing and fault tolerance according to some embodiments. As shown, the communication links in the table 1000 are associated with a heterogeneous computing platform structure similar to the heterogeneous computing platform 200 of FIG. 7. Each communication link is represented as (x,y) in which node 303A is represented as '1', node 303B is represented as '2', node 303C is represented as '3', node 303D is represented as '4', and the orchestrator 302 is represented as '5'. With regard to the paths available between the orchestrator 302 and node 303C, the available paths may include a first path 1302 (e.g., communication link (3,5)), a second path 1304 (e.g., communication links (1,5), (1,2), and (2,3)), and a third path 1306 (e.g., communication links (2,5) and (2,3)). Although the first path (e.g., communication link (3,5)) may be the best, when considering the collective loading on communication link (3,5) or other factors, it may be deemed beneficial to select a different path between the orchestrator 302 and node 303C. Thus, the optimal path selection system may be used to provide for load balancing for certain communication links in the heterogeneous computing platform.

FIG. 14 illustrates an example table 1400 that may be used to select a path based upon certain criteria according to some embodiments. The table 1400 includes multiple rows 1402*a-e* each indicating a particular selection algorithm. Row 1402*a* indicates a shortest queue bytes selection algorithm, row 1402*b* indicates a shortest queue service time selection algorithm, row 1402*c* indicates a round robin selection algorithm, and row 1402*d* indicates a weighted round robin selection algorithm, and row 1402*e* represents any other suitable selection algorithm that can be used.

Scenarios exist in which even if the optimal path for a particular node is selected, the overall operation of the heterogeneous computing platform may suffer performance degradation. For example, the algorithm may determine that one particular communication link may be included in the optimal paths for multiple nodes, the BW capacity of that communication link may become overly burdened such that the performance of all of the nodes using that communication link would suffer. Thus, it would be beneficial to provide load balancing to ensure no one certain communication link is overburdened. Additionally, provisions should be made to provide fault tolerance for conditions where the optimal path selection system 1000 could switch to an alternate path when a communication link in a first path fails.

According to embodiments of the present disclosure, the OS agent may select a preferred path for communicating with a node based on certain factors, such as how large a buffer queue can be, the service time to the buffer queue, load balancing, and the like. For example, the OS agent may receive a message from an application, such as a videoconferencing application, that a video conference is being initiated. In response, the OS agent may communicate with the orchestrator 302 to request paths to a node associated with an Ethernet network card and a node associated with a display that have good throughput (BW) and low latency. When the video conference is finished, the application may again communicate with the orchestrator 302 to request paths that are more energy efficient to save on power usage.

In one embodiment, the optimal path selection system may be used to stop or pause traffic from going through a bad or faulty path. Across the available paths, if a specific path results in a delay (e.g., 300 milliseconds) or error (e.g., >=5%), that path may be marked as bad and thus not be considered for use. In such a case, the path may be reinstated if the delay or error is corrected. In another embodiment, the optimal path selection system may determine an alternate path when a particular communication link is determined to be faulty. Once the communication link is marked as bad, all communication links through the communication link may be paused until the pending traffic is retried in a new path that is selected using the same path selection algorithm. In yet another embodiment, the optimal path selection system may accelerate path selection via caching. If the communication between the node 303A and the OS agent (through orchestrator 302) takes an excessively long time, the path selection algorithm may be computed at the node 303A for better performance. Additionally, if the path selection algorithm is changed by the OS agent, node 303A may perform a re-synchronization of algorithm details and resume the path selection algorithm compute operations.

Figure 15:
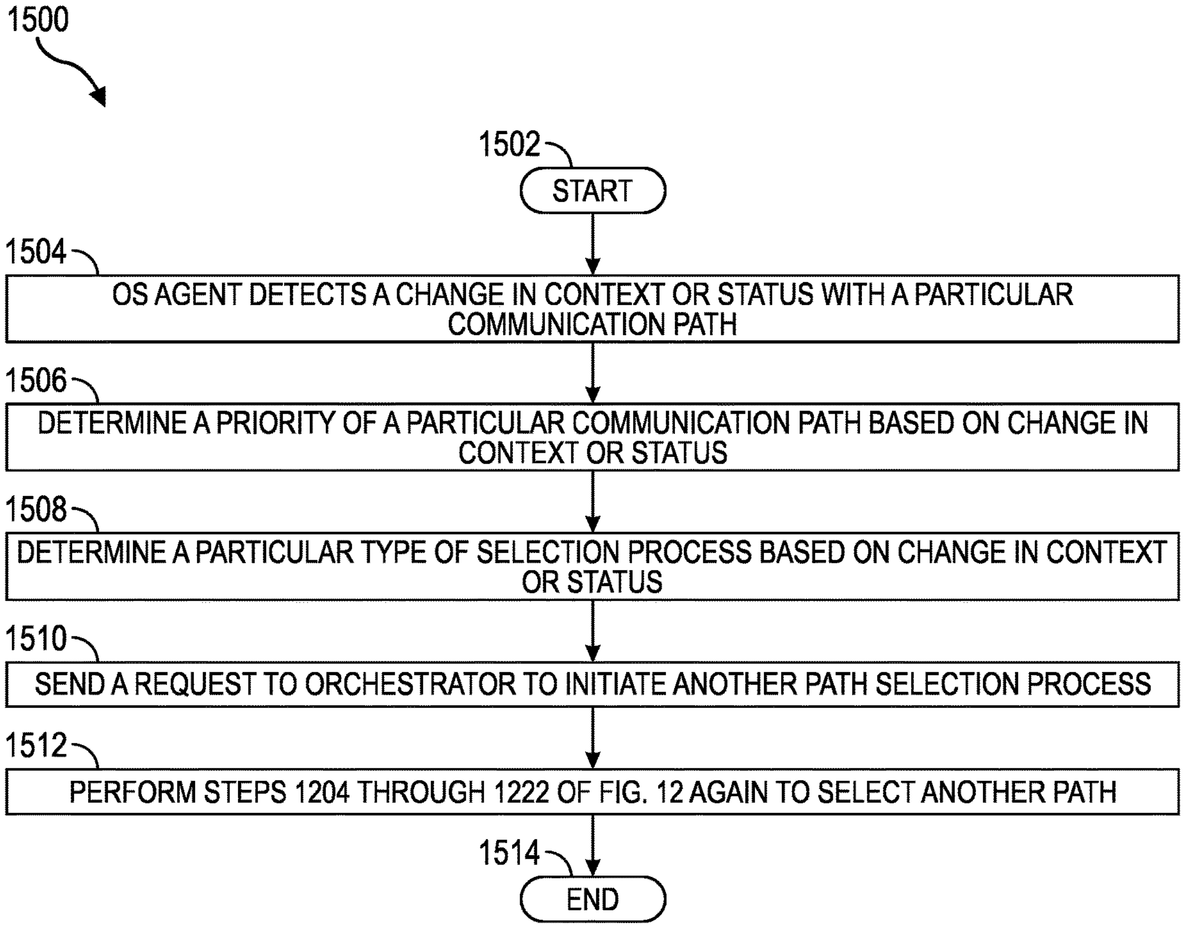
FIG. 15 illustrates an example optimal path selection method that may be performed to again select another optimal path due to changes in context or status in a heterogeneous computing platform according to some embodiments of the present disclosure.

FIG. 15 illustrates an example optimal path selection method 1500 that may be performed to again select another optimal path due to changes in context or status in a heterogeneous computing platform according to some embodiments of the present disclosure. Additionally or alternatively, the method 1500 may be performed by any suitable device, such as the orchestrator 302 running in the heterogeneous computing platform. The method 1500 may be performed wherever the IHS changes context (e.g., one application is exited, another application is launched, etc.), or the operational status of a device in the IHS changes (e.g., a device fails or begins to experience errors). Initially, the heterogeneous computing platform is running and the steps of FIG. 12 have previously been performed.

The method 1500 starts at step 1502. At step 1504, the OS agent detects a change in context or operational status with a particular communication path. For example, a user may quit using or start using another application. As another example, the OS agent or orchestrator 302 may detect that a communication path becomes overloaded. As yet another example, an endpoint (node 303) associated with the communication path fails or begins experiencing errors (e.g., Bit Error Rate (BER) increases).

At step 1506, the method 1500 determines a priority of a particular communication path based on change in context or status. The method 1500 may also determine a particular type of selection process based on change in context or status at step 1508. For example, the method 1500 may select either of a shortest queue bytes selection algorithm, a shortest queue service time selection algorithm, a round robin selection algorithm, or a weighted round robin selection algorithm based upon the change in context and/or status. Once the selection algorithm has been selected, the method 1500 may send a request to the orchestrator 302 to initiate another path selection process at step 1510. Thereafter at step 1512, the method 1500 may perform steps 1204 through 1222 of FIG. 12 again to select another path. Once steps 1204 through 1222 have been again performed to select another path, the process ends at step 1514.

Although FIG. 15 describes an example method 1500 that may be performed to again select another optimal path due to changes in context or status, the features of the method 1500 may be embodied in other specific forms without deviating from the spirit and scope of the present disclosure. For example, the method 1500 may perform additional, fewer, or different operations than those described in the present examples. For another example, the method 1500 may be performed in a sequence of steps different from that described above. As yet another example, certain steps of the method 1500 may be performed by other components than those described above, such as by the orchestrator 302 and/or one or more of the nodes 303.

To implement various operations described herein, computer program code (i.e., program instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks.

Program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices.

Similarly, operational data may be identified and illustrated herein within modules and may be embodied in any suitable form and organized within any suitable type of data structure. Operational data may be collected as a single data set or may be distributed over different locations including over different storage devices.

Reference is made herein to "configuring" a device or a device "configured to" perform some operation(s). It should be understood that this may include selecting predefined logic blocks and logically associating them. It may also include programming computer software-based logic of a retrofit control device, wiring discrete hardware components, or a combination thereof. Such configured devices are physically designed to perform the specified operation(s).

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs.

As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS), comprising:

a heterogeneous computing platform in communication with an Operating System (OS) of the IHS, the heterogeneous computing platform comprising:

a controller, wherein the controller comprises controller firmware that, upon execution by a controller processing core, causes the controller processing core to instantiate an orchestrator;

a plurality of devices coupled to and controlled by the controller, wherein each device comprises device firmware that, upon execution by a corresponding device processing core, causes the corresponding device processing core to instantiate a node of the heterogeneous computing platform; and a memory coupled to the controller processing core, the memory having program instructions stored thereon that, upon execution by the processor, cause the controller processing core to:

identify a plurality of communication links between the nodes, wherein the communication links cause at least one of the nodes to have multiple paths to the orchestrator;

determine a best path to the controller for the at least one node;

after the best path has been selected, determine that either at least one application has been exited or another application has been launched;

select another best path for the at least one node; and communicate with the at least one node using the other best path.

2. The IHS of claim 1, wherein the program instructions further cause the processor to receive a request to perform the acts of identifying the plurality of communication links, determining the best path, and instructing the controller from an OS agent executed on an Operating System (OS) of the IHS.

3. The IHS of claim 1, wherein the communication path conforms to at least one of an I2C, a USB, or a Serial Peripheral Interface (SPI) protocol.

4. The IHS of claim 1, wherein the program instructions further cause the processor to determine the best path using a Depth First Search (DFS) algorithm.

5. The IHS of claim 1, wherein the program instructions further cause the processor to select the best path according to one or more properties of each communication link.

6. The IHS of claim 5, wherein the properties comprise at least one of a Bandwidth (BW) capacity, a latency, a performance level, an amount of electrical power used, or a link reliability of the communication link.

7. The IHS of claim 1, wherein the program instructions further cause the processor to:

after the best path has been selected and the context or operational status of the IHS has changed, wherein the change in the context or the operational status comprises at least one of a device in the IHS fails or begins to experience errors, a communication path becomes overloaded, an endpoint associated with the communication path fails or begins experiencing errors, the at least one application has been exited or the other application has been launched; and select the other best path for the at least one node.

8. The IHS of claim 1, wherein the program instructions further cause the processor to select a path selection algorithm according to the change in the context or the operational status of the IHS.

9. The IHS of claim 1, wherein the program instructions further cause the processor to perform the acts of identifying the plurality of communication links, determining the best path, and instructing the controller without any involvement by the Operating System (OS) of the IHS.

10. An optimal communication path selection method comprising:

identifying, using a controller of a heterogeneous computing platform in communication with an Operating System (OS) of an Information Handling System (IHS), a plurality of communication links between a plurality of nodes configured in the heterogeneous computing platform, wherein the communication links cause at least one of the nodes to have multiple paths to an orchestrator, the heterogeneous computing platform comprising a controller that controls the operation of a plurality of devices that form the nodes;

determining a best path to the controller for the at least one node;

after the best path has been selected, determining that either at least one application has been exited or another application has been launched;

selecting another best path for the at least one node; and communicating with the at least one node using the other best path.

11. The optimal communication path selection method of claim 10, further comprising receiving a request to perform the acts of identifying the plurality of communication links, determining the best path, and instructing the controller from an OS agent executed on an Operating System (OS) of the heterogeneous computing platform.

12. The optimal communication path selection method of claim 10, further comprising determining the best path using a Depth First Search (DFS) algorithm.

13. The optimal communication path selection method of claim 10, further comprising selecting the best path according to one or more properties of each communication link.

14. The optimal communication path selection method of claim 10, further comprising:

after the best path has been selected and the context or operational status of the IHS has changed, wherein the change in the context or the operational status comprises at least one of a device in the IHS fails or begins to experience errors, a communication path becomes overloaded, an endpoint associated with the communication path fails or begins experiencing errors, the at least one application has been exited or the other application has been launched; and selecting another the other best path for the at least one node.

15. The optimal communication path selection method of claim 10, further comprising selecting a path selection algorithm according to the change in the context or the operational status of the IHS.

16. The optimal communication path selection method of claim 10, further comprising performing the acts of identifying the plurality of communication links, determining the best path, and instructing the controller without any involvement by the Operating System (OS) of the IHS.

17. An Embedded Controller (EC) integrated into or coupled to a heterogeneous computing platform of an Information Handling System (IHS), the EC comprising:

a processing core distinct from any host processor of the heterogeneous computing platform in communication with an Operating System (OS) of the IHS, the heterogeneous computing platform comprising a controller that controls the operation of a plurality of devices that form the nodes; and a memory coupled to the processing core, the memory having firmware stored thereon that, upon execution by the processing core, cause the EC to:

identify a plurality of communication links between a plurality of nodes of the heterogeneous computing platform, wherein the communication links cause at least one of the nodes to have multiple paths to the EC;

determine a best path to a controller for the at least one node;

after the best path has been selected, determine that either at least one application has been exited or another application has been launched;

select another best path for the at least one node; and communicate with the at least one node using the other best path.

18. The EC of claim 17, wherein the firmware further causes the EC to determine the best path using a Depth First Search (DFS) algorithm.

19. The EC of claim 17, wherein the firmware further causes the EC to select the best path according to one or more properties of each communication link, wherein the properties comprise at least one of a Bandwidth (BW) capacity, a latency, a performance level, an amount of electrical power used, or a link reliability of the communication link.

20. The EC of claim 17, wherein the firmware further causes the EC to:

after the best path has been selected and the context or operational status of the IHS has changed, wherein the change in the context or the operational status comprises at least one of a device in the IHS fails or begins to experience errors, a communication path becomes overloaded, an endpoint associated with the communication path fails or begins experiencing errors, the at least one application has been exited or the other application has been launched; and select the other best path for the at least one node.

* * * * *